United States Patent
DeWaard

(10) Patent No.: US 10,603,611 B2
(45) Date of Patent: Mar. 31, 2020

(54) CLEANING SYSTEMS AND METHODS FOR ROTARY SCREEN SEPARATORS

(71) Applicant: Daritech, Inc., Lynden, WA (US)

(72) Inventor: David DeWaard, Lynden, WA (US)

( * ) Notice: Subject to any disclaimer, the term of this patent is extended or adjusted under 35 U.S.C. 154(b) by 223 days.

(21) Appl. No.: 14/726,848

(22) Filed: Jun. 1, 2015

(65) Prior Publication Data
US 2015/0343344 A1    Dec. 3, 2015

Related U.S. Application Data

(60) Provisional application No. 62/005,910, filed on May 30, 2014.

(51) Int. Cl.
*B01D 35/16* (2006.01)
*B01D 33/067* (2006.01)
(Continued)

(52) U.S. Cl.
CPC ............ *B01D 33/067* (2013.01); *B01D 33/11* (2013.01); *B01D 33/463* (2013.01); *B01D 33/50* (2013.01);
(Continued)

(58) Field of Classification Search
CPC .... B01D 33/067; B01D 33/11; B01D 33/463; B01D 33/503; B01D 33/50; B01D 33/72; B01D 21/2461; B01D 46/0068; B01D 46/04; B01D 46/002; B01D 46/0058; B01D 46/0065; B01D 46/0086; B01D 46/0005;
(Continued)

(56) References Cited

U.S. PATENT DOCUMENTS 683,826 A    10/1901    Wells
832,191 A    10/1906    Holzer
(Continued)

FOREIGN PATENT DOCUMENTS

CA    2336838    6/2001
CA    2690420    7/2010
(Continued)

OTHER PUBLICATIONS

USPTO, "Final Office Action, U.S. Appl. No. 14/699,608", dated Jun. 14, 2017, 8 pages.
(Continued)

*Primary Examiner* — Dung H Bui
(74) *Attorney, Agent, or Firm* — Williams Kastner & Gibbs PLLC; Mark Lawrence Lorbiecki

(57) ABSTRACT

A cleaning system for a screen of a rotary screen separator for processing feed material comprising liquids and solids has a housing, an air source, and a conduit system. The housing defines at least one housing chamber, at least one inlet opening, and at least one outlet slot. The conduit system is operatively connected between the inlet opening of the housing and the air source. Air flows from the air source through conduit system, through the inlet opening, into the housing chamber, and out of the housing chamber through the at least one outlet slot in at least one air flow stream extending along a flow plane. The housing is arranged relative to the screen of the rotatory screen separator such that the air flow stream impinges on the screen to remove debris from the screen.

15 Claims, 19 Drawing Sheets

(51) Int. Cl.
*B01D 33/50* (2006.01)
*B01D 33/72* (2006.01)
*B01D 33/11* (2006.01)
*B01D 33/46* (2006.01)
*C02F 103/20* (2006.01)
*B01D 21/24* (2006.01)
*C05F 3/00* (2006.01)

(52) U.S. Cl.
CPC .......... *B01D 33/503* (2013.01); *B01D 33/72* (2013.01); *B01D 21/2461* (2013.01); *C02F 2103/20* (2013.01); *C05F 3/00* (2013.01); *Y02P 20/145* (2015.11)

(58) Field of Classification Search
CPC . B01D 46/0023; B01D 46/10; C02F 2103/20; C05F 3/00; Y02P 20/145; F24F 11/39
See application file for complete search history.

(56) References Cited

U.S. PATENT DOCUMENTS

| | | | |
|---|---|---|---|
| 992,629 A | 5/1911 | Akins | |
| 1,347,724 A | 7/1920 | Ernst | |
| 1,554,943 A * | 9/1925 | Antoine | D21F 1/66 |
| | | | 210/106 |
| 1,658,040 A | 2/1928 | Cohn | |
| 1,726,608 A * | 9/1929 | Brackett | B01D 33/11 |
| | | | 210/161 |
| 1,993,214 A | 3/1935 | Hass | |
| 2,066,479 A | 1/1937 | MacIsaac | |
| 2,116,863 A * | 5/1938 | Dinley | B05B 1/042 |
| | | | 239/594 |
| 2,278,525 A | 4/1942 | Rich | |
| 2,530,671 A * | 11/1950 | Wahlin | B05B 1/267 |
| | | | 239/523 |
| 2,630,906 A | 3/1953 | Philipp | |
| 2,680,602 A | 6/1954 | Nelson et al. | |
| 2,747,741 A | 5/1956 | Jacobson | |
| 2,942,731 A | 6/1960 | Soldini | |
| 2,982,411 A | 5/1961 | Fontein | |
| 3,007,518 A | 11/1961 | Simpson | |
| 3,333,700 A | 8/1967 | Coleman | |
| 3,440,674 A * | 4/1969 | Carver | A23N 12/023 |
| | | | 134/65 |
| 3,521,824 A * | 7/1970 | Wilcox | B05B 7/0075 |
| | | | 239/299 |
| 3,527,668 A | 9/1970 | Kusters | |
| 3,606,945 A | 9/1971 | Watson et al. | |
| 3,626,486 A | 12/1971 | Bugbee et al. | |
| 3,649,708 A * | 3/1972 | Schroeder | B01D 9/0013 |
| | | | 585/813 |
| 3,730,887 A | 5/1973 | Suzuki et al. | |
| 3,736,111 A | 5/1973 | Gardner et al. | |
| 3,736,120 A | 5/1973 | Tempe | |
| 3,761,237 A | 9/1973 | Jeffreys | |
| 3,772,144 A | 11/1973 | Luthi et al. | |
| 3,773,659 A | 11/1973 | Carlson et al. | |
| 3,865,727 A | 2/1975 | Baker et al. | |
| 3,886,063 A | 5/1975 | Friesz | |
| 3,971,720 A | 7/1976 | Swanson et al. | |
| 3,979,289 A * | 9/1976 | Bykowski | B01D 37/04 |
| | | | 210/403 |
| 3,982,499 A | 9/1976 | Frankl | |
| 4,062,779 A | 12/1977 | Nakamura et al. | |
| 4,097,379 A | 6/1978 | Shelstad | |
| 4,121,539 A | 10/1978 | Moore | |
| 4,128,206 A * | 12/1978 | Bintner | B05B 1/042 |
| | | | 239/11 |
| 4,160,724 A | 7/1979 | Laughton | |
| 4,192,745 A | 3/1980 | Hood | |
| 4,193,206 A | 3/1980 | Maffet | |
| 4,240,072 A * | 12/1980 | Fowler | A47L 9/19 |
| | | | 324/127 |
| 4,285,816 A | 8/1981 | Lee | |
| 4,303,523 A | 12/1981 | Ruppnig | |
| 4,310,424 A | 1/1982 | Fremont et al. | |
| 4,315,821 A | 2/1982 | Climenhage | |
| 4,324,659 A | 4/1982 | Titoff | |
| 4,364,831 A | 12/1982 | Burns et al. | |
| 4,382,857 A | 5/1983 | Laughlin | |
| 4,395,331 A | 7/1983 | Andersson | |
| 4,416,764 A | 11/1983 | Gikis et al. | |
| 4,460,470 A | 7/1984 | Reimann | |
| 4,507,202 A | 3/1985 | Nord et al. | |
| 4,608,157 A | 8/1986 | Graves | |
| 4,701,266 A | 10/1987 | Janka et al. | |
| 4,842,722 A * | 6/1989 | Holz | B01D 33/073 |
| | | | 209/270 |
| 4,849,105 A | 7/1989 | Borchert | |
| 4,867,870 A * | 9/1989 | Kettlety | B01D 33/11 |
| | | | 15/104.04 |
| 4,880,530 A | 11/1989 | Frey | |
| 5,011,330 A * | 4/1991 | Kittle | B05B 1/04 |
| | | | 405/129.9 |
| 5,022,989 A | 6/1991 | Put | |
| 5,030,348 A | 7/1991 | Bengt | |
| 5,041,223 A | 8/1991 | Johansson et al. | |
| 5,098,572 A | 3/1992 | Faup et al. | |
| 5,133,872 A | 7/1992 | Baldwin et al. | |
| 5,213,696 A * | 5/1993 | Patrone | B01D 33/073 |
| | | | 210/791 |
| 5,275,728 A | 1/1994 | Koller | |
| 5,290,451 A | 3/1994 | Koster et al. | |
| 5,372,713 A | 12/1994 | Huber | |
| 5,409,610 A | 4/1995 | Clark | |
| 5,423,977 A * | 6/1995 | Aoki | B01D 33/073 |
| | | | 210/107 |
| 5,466,189 A | 11/1995 | Deutsch et al. | |
| 5,472,472 A | 12/1995 | Northrop | |
| 5,507,396 A | 4/1996 | Hauch | |
| 5,520,779 A | 5/1996 | Bold | |
| 5,524,796 A | 6/1996 | Hyer | |
| 5,531,898 A | 7/1996 | Wickham | |
| 5,587,073 A | 12/1996 | Zittel | |
| 5,728,297 A | 3/1998 | Koller | |
| 5,817,241 A | 10/1998 | Brayboy | |
| 5,884,643 A * | 3/1999 | Shimizu | B21B 45/08 |
| | | | 134/166 R |
| 5,885,461 A | 3/1999 | Tetrault et al. | |
| 5,894,936 A * | 4/1999 | Sanders | B07B 1/24 |
| | | | 119/216 |
| 5,897,788 A * | 4/1999 | Ketolainen | B01D 33/073 |
| | | | 210/784 |
| 5,910,243 A | 6/1999 | Bruke | |
| 5,950,839 A | 9/1999 | Wedel | |
| 5,968,372 A * | 10/1999 | Martensson | B01D 33/21 |
| | | | 210/741 |
| 5,989,419 A * | 11/1999 | Dudley | B01D 41/04 |
| | | | 134/138 |
| 6,039,874 A | 3/2000 | Teran et al. | |
| 6,044,980 A | 4/2000 | Houle | |
| 6,077,548 A | 6/2000 | Lasseur et al. | |
| 6,083,386 A | 7/2000 | Lloyd | |
| 6,096,201 A | 8/2000 | Bruke | |
| 6,105,536 A | 8/2000 | DeWaard | |
| 6,109,450 A | 8/2000 | Grunenwald et al. | |
| 6,136,185 A | 10/2000 | Sheaffer | |
| 6,190,566 B1 | 2/2001 | Kolber | |
| 6,193,889 B1 | 2/2001 | Teran et al. | |
| 6,227,379 B1 | 5/2001 | Neseth | |
| 6,231,631 B1 | 5/2001 | Suzuki | |
| 6,245,121 B1 | 6/2001 | Lamy et al. | |
| 6,346,240 B1 | 2/2002 | Moore, Jr. | |
| 6,355,167 B1 | 3/2002 | Wensauer | |
| 6,375,844 B1 | 4/2002 | Ehrlich | |
| 6,387,267 B1 | 5/2002 | Kantardjieff | |
| 6,398,959 B1 | 6/2002 | Teran et al. | |
| 6,443,094 B1 | 9/2002 | DeWaard | |
| 6,470,828 B1 | 10/2002 | Townsend et al. | |
| 6,475,377 B1 * | 11/2002 | Fox | B01D 29/096 |
| | | | 210/90 |

(56) References Cited

U.S. PATENT DOCUMENTS

| | | |
|---|---|---|
| 6,663,782 B2 | 12/2003 | Morse et al. |
| 6,890,429 B2 | 5/2005 | Herring, Sr. |
| 6,908,554 B2 | 6/2005 | Jackson |
| 6,997,135 B1 | 2/2006 | DeWaard |
| 7,001,512 B1 | 2/2006 | Newsome |
| 7,005,068 B2 | 2/2006 | Hoffland |
| 7,051,962 B2 | 5/2006 | Whitsel et al. |
| 7,067,065 B2 | 6/2006 | Schloss |
| 7,255,223 B2 | 8/2007 | Schaer et al. |
| 7,258,238 B2 | 8/2007 | Raghupathy |
| 7,306,731 B1 | 12/2007 | DeWaard |
| 7,461,744 B2 * | 12/2008 | Hautala .......... D21B 1/32 |
| | | 209/270 |
| 7,631,595 B1 | 12/2009 | DeWaard |
| 7,891,496 B2 | 2/2011 | Fendley |
| 7,964,105 B2 | 6/2011 | Moss |
| 7,972,517 B1 | 7/2011 | Miller |
| 7,987,770 B2 | 8/2011 | Klump et al. |
| 7,987,778 B1 | 8/2011 | DeWaard |
| 8,142,667 B2 | 3/2012 | DeWaard |
| 8,201,495 B2 | 6/2012 | DeWaard |
| 8,470,183 B2 | 6/2013 | DeWaard |
| 8,544,383 B2 | 10/2013 | Courtemanche et al. |
| 8,889,016 B2 | 11/2014 | DeWaard |
| 8,926,846 B2 | 1/2015 | DeWaard |
| 9,352,983 B2 * | 5/2016 | Massey ............ C02F 1/283 |
| 9,597,618 B2 | 3/2017 | DeWaard |
| 9,610,521 B2 | 4/2017 | DeWaard |
| 9,770,684 B1 * | 9/2017 | Kelyman ......... B01D 46/0068 |
| 10,143,946 B2 * | 12/2018 | Starcevic ........ B01D 33/50 |
| 2001/0013497 A1 | 8/2001 | Kolber |
| 2002/0020677 A1 | 2/2002 | Noll |
| 2002/0079266 A1 | 6/2002 | Ainsworth et al. |
| 2002/0084227 A1 | 7/2002 | Sower |
| 2002/0086077 A1 | 7/2002 | Noller et al. |
| 2003/0057160 A1 | 3/2003 | Williams et al. |
| 2004/0074835 A1 | 4/2004 | Yoshimoto et al. |
| 2004/0154988 A1 | 8/2004 | Sheets, Sr. |
| 2004/0159282 A1 * | 8/2004 | Sanner ............ B05B 5/032 |
| | | 118/620 |
| 2004/0159608 A1 | 8/2004 | Hoffland |
| 2005/0222289 A1 * | 10/2005 | Miller ............ B29C 44/468 |
| | | 521/155 |
| 2006/0191828 A1 * | 8/2006 | Cummins ......... B01D 33/11 |
| | | 210/97 |
| 2006/0266676 A1 | 11/2006 | Bossen |
| 2006/0273048 A1 | 12/2006 | Doyle et al. |
| 2007/0289917 A1 | 12/2007 | Mylin et al. |
| 2008/0017733 A1 * | 1/2008 | Hansson ......... B05B 7/025 |
| | | 239/292 |
| 2009/0026152 A1 * | 1/2009 | Collins .......... B01D 33/21 |
| | | 210/791 |
| 2009/0057235 A1 * | 3/2009 | Sugaya .......... B01D 33/11 |
| | | 210/709 |
| 2009/0090679 A1 | 4/2009 | DeWaard |
| 2009/0108509 A1 * | 4/2009 | Seruzawa ........ B21B 45/0218 |
| | | 266/114 |
| 2009/0149571 A1 | 6/2009 | Lux et al. |
| 2009/0230221 A1 * | 9/2009 | Ballu ........... B05B 1/042 |
| | | 239/597 |
| 2010/0112632 A1 | 5/2010 | DeWaard |
| 2011/0036769 A1 | 2/2011 | Homma et al. |
| 2011/0059255 A1 * | 3/2011 | Ogonowski ...... B05B 1/042 |
| | | 427/422 |
| 2011/0100930 A1 | 5/2011 | DeWaard |
| 2011/0146004 A1 * | 6/2011 | Kim ............. D06F 33/02 |
| | | 8/137 |
| 2011/0198268 A1 * | 8/2011 | DeWaard ......... B01D 33/11 |
| | | 209/270 |
| 2011/0233132 A1 * | 9/2011 | Wietharn ........ B01D 33/073 |
| | | 210/403 |
| 2011/0253227 A1 | 10/2011 | DeWaard |
| 2011/0309039 A1 | 12/2011 | DeWaard |
| 2012/0000863 A9 | 1/2012 | DeWaard |
| 2012/0031856 A1 | 2/2012 | Courtemanche et al. |
| 2012/0073251 A1 * | 3/2012 | Troxell .......... B01D 46/0068 |
| | | 55/302 |
| 2012/0079863 A1 * | 4/2012 | Hosho ........... B21B 45/0218 |
| | | 72/201 |
| 2012/0091234 A1 * | 4/2012 | Carmein ......... H02N 3/00 |
| | | 239/690 |
| 2012/0132734 A1 | 5/2012 | DeWaard |
| 2012/0138515 A1 | 6/2012 | DeWaard |
| 2012/0219428 A1 * | 8/2012 | Cantolino ....... F04B 49/02 |
| | | 417/12 |
| 2012/0247927 A1 | 10/2012 | Marchesini |
| 2013/0239802 A1 * | 9/2013 | Troxell .......... B01D 46/0086 |
| | | 95/20 |
| 2013/0299395 A1 * | 11/2013 | DeWaard ......... B07B 1/00 |
| | | 209/235 |
| 2014/0083957 A1 | 3/2014 | DeWaard |
| 2014/0091043 A1 | 4/2014 | DeWaard |
| 2015/0008193 A1 | 1/2015 | DeWaard |
| 2015/0053594 A1 | 2/2015 | DeWaard |
| 2015/0076084 A1 | 3/2015 | Tange |
| 2015/0083672 A1 | 3/2015 | DeWaard |
| 2015/0122747 A1 | 5/2015 | DeWaard |
| 2015/0224551 A1 * | 8/2015 | Haraguchi ....... B05B 1/306 |
| | | 72/342.2 |
| 2015/0251112 A1 | 9/2015 | DeWaard |
| 2015/0343343 A1 * | 12/2015 | DeWaard ......... B01D 33/50 |
| | | 210/787 |
| 2016/0100620 A1 * | 4/2016 | Massey .......... A23B 4/22 |
| | | 426/335 |
| 2016/0129377 A1 * | 5/2016 | Stewart ......... B01D 33/48 |
| | | 210/107 |
| 2017/0209818 A1 | 7/2017 | DeWaard |

FOREIGN PATENT DOCUMENTS

| | | |
|---|---|---|
| CA | 2719630 | 5/2011 |
| CA | 2732065 A1 | 8/2011 |
| CA | 2737609 | 10/2011 |
| CA | 2764679 | 7/2012 |
| CN | 201150915 | 11/2008 |
| CN | 103771645 A | 5/2014 |
| DE | 4042167 | 7/1991 |
| DE | 4239083 A | 6/1993 |
| DE | 4337890 A1 | 5/1994 |
| DE | 4143376 C2 | 12/1994 |
| EP | 0126655 A2 | 11/1984 |
| EP | 0565268 A2 | 10/1993 |
| EP | 1327470 B1 | 8/2005 |
| JP | 5626697 A | 3/1981 |
| JP | 0985122 A | 3/1997 |
| SE | 434014 B | 7/1984 |
| WO | 9507744 A1 | 3/1995 |

OTHER PUBLICATIONS

USPTO, "Final Office Action, U.S. Appl. No. 14/722,590", dated Jun. 23, 2017, 12 pages.
Accent Manufacturing, "TFSS 60 Sand Trap," Brochure found on Website http://www.accentmanufacturing.com/sand-separator.html, 4 pages.
Daritech, Inc., "EYS Separator" Brochure, Jun. 2008, 2 pages.
Daritech, Inc., "EYS Separator" Brochure, May 2008, 4 pages.
Daritech, Inc., "Roller Press" Brochure, Feb. 2010, 2 pages.
Daritech, Inc., "Roller Press" Brochure, Sep. 2008, 1 page.
McLanahan Agricultural Systems, "Sand Solutions" Brochure, 8 pages.
Parkson Corporation, "Parkson Sand Saver," found on Website http://www.henkhuizenga.com/parsonsandseparator.htm, 27 pages.
Canadian Intellectual Property Office, "Office Action, Application No. 2,764,679", dated Aug. 16, 2017, 3 pages.
European Patent Office, Examination Report, 12000305.8, dated May 26, 2017, 4 pages.
USPTO, "Non-Final Office Action, U.S. Appl. No. 14/322,858" dated Oct. 3, 2017, 10 pages.

(56) References Cited

OTHER PUBLICATIONS

USPTO, "Non-Final Office Action, U.S. Appl. No. 14/699,608," dated Oct. 2, 2017, 24 pages.
USPTO, "Non-Final Office Action, U.S. Appl. No. 14/722,590," dated Sep. 19, 2017, 30 pages pages.
USPTO, "Non-Final Office Action, U.S. Appl. No. 14/929,666," dated Nov. 22, 2017, 31 pages.
USPTO, "Final Office Action, U.S. Appl. No. 14/722,590", dated May 1, 2018, 12 pages.

* cited by examiner

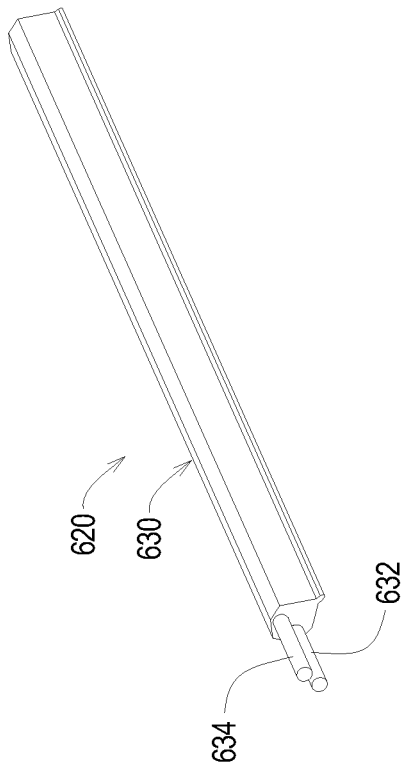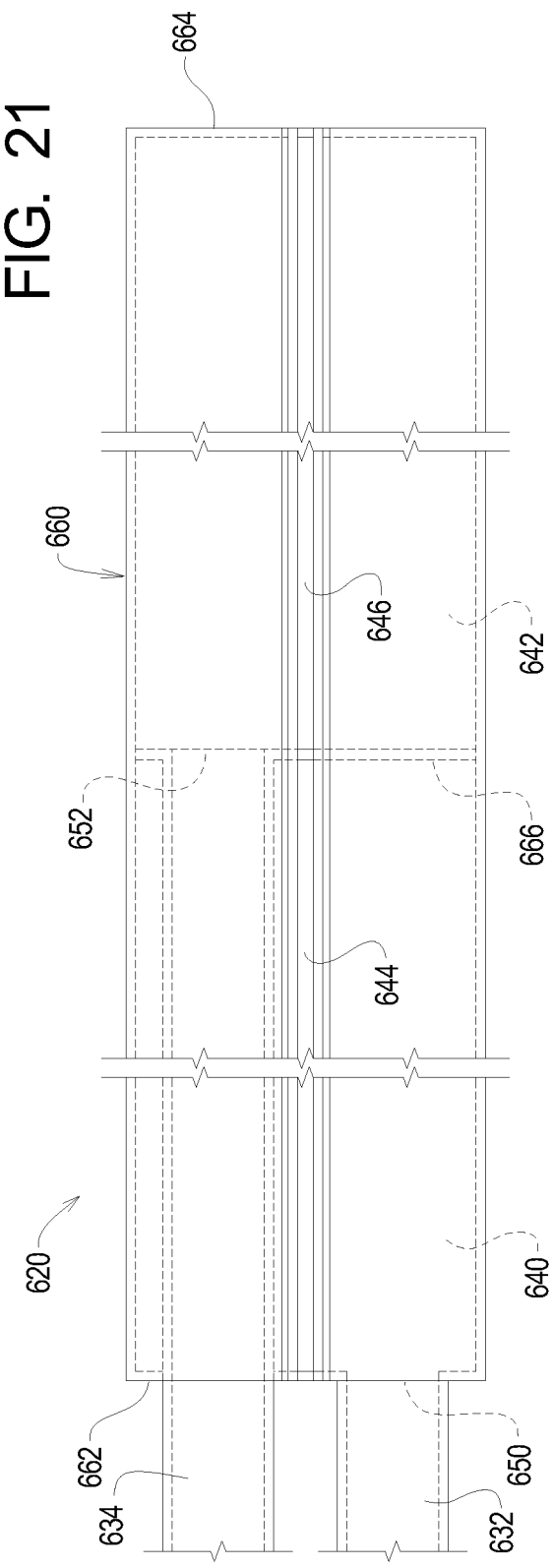

CLEANING SYSTEMS AND METHODS FOR ROTARY SCREEN SEPARATORS

RELATED APPLICATIONS

This application, U.S. patent application Ser. No. 14/726,848 filed Jun. 1, 2015 claims benefit of U.S. Provisional Application Ser. No. 62/005,910 filed May 30, 2014, now expired, the contents of which are incorporated herein by reference.

TECHNICAL FIELD

This disclosure relates to the field of rotary separators used to separate effluent into different fractions depending upon the diameter of the solid components and, more particularly, to systems and methods for cleaning the screens of such rotary separators during operation.

BACKGROUND

Rotary screen separators are often used to process effluent such as waste from a dairy operation. Generally speaking, rotary screen separators separate a feed material into solid and liquid components by displacing the feed material along a first side of a screen such that solid material remains on the first side and liquid material passes through perforations in the screen to a second side thereof.

Conventionally, rotary screen separators employ a screen having screen openings for maintaining solids within the screen and allowing water to pass through the screen. Solids can accumulate on the screen and interfere with the separation of solids from liquids.

The need exists for an improved rotary screen separator that optimizes the removal of solids and water from a feed material.

SUMMARY

The present invention may be embodied as a cleaning system for a screen of a rotary screen separator for processing feed material comprising liquids and solids, the cleaning system comprising a housing, an air source, and a conduit system. The housing defines at least one housing chamber, at least one inlet opening, and at least one outlet slot. The conduit system is operatively connected between the inlet opening of the housing and the air source. Air flows from the air source through conduit system, through the inlet opening, into the housing chamber, and out of the housing chamber through the at least one outlet slot in at least one air flow stream extending along a flow plane. The housing is arranged relative to the screen of the rotatory screen separator such that the air flow stream impinges on the screen to remove debris from the screen.

The present invention may also be embodied as a rotary screen separator for processing feed material comprising liquids and solids comprising a screen, a drive system, at least one vane structure, and a cleaning system. The screen defines a longitudinal axis, an input port, and an output port. The drive system is for rotating the screen. The cleaning system comprises a housing, an air source, and a conduit system. The housing defines at least one housing chamber, at least one inlet opening, and at least one outlet slot. The conduit system is operatively connected between the inlet opening of the housing and the air source. Operation of the drive system to rotate the separator causes the at least one vane structure to displace the feed material along the longitudinal axis. Air flows from the air source through conduit system, through the inlet opening, into the housing chamber, and out of the housing chamber through the at least one outlet slot in at least one air flow stream extending along a flow plane. The housing is arranged relative to the screen of the rotatory screen separator such that the air flow stream impinges on the screen to remove debris from the screen.

BRIEF DESCRIPTION OF THE DRAWINGS

FIG. 20 is a perspective view illustrating a second example outlet assembly that may be used with a cleaning system of the present invention; and FIG. 21 is an elevation view looking along a plane extending through an outlet slot defined by the second example outlet assembly.

DETAILED DESCRIPTION

A rotary screen separator is disclosed herein which may generally comprise a frame and a rotating perforated screen supported by the frame. In one form, the rotating screen is horizontally aligned at a slight angle and often comprises an internal screw flight. The screw flight is operatively configured to reposition the media to be separated from the input end of the separator to the solids discharge end. As the material moves through the screen separator, liquid and fine particles are removed through the perforations in the screen.

The example hybrid rotary screen separator of the present invention comprises at least two separate regions each comprising a different screen size. In the example hybrid rotary screen separator disclosed herein, the perforations of the screen on the input end of the separator comprise a much finer hole size than the perforations toward the solid discharge end. These regions of fine screen and coarse screen may be separate structures which may be interconnected, or may alternatively be a unitary structure with separate regions of varying screen sizes along the length. In one form, these are connected to the same cylinder-like structure.

The rotary screen separator of the present invention is adapted to process a high liquid content media (effluent) or feed material comprising both a solid component and a liquid component. As the feed material enters the fine portion of the screen, a percentage of the liquid is removed. As the feed material transfers to the coarse portion of the separator, more of the liquid is allowed to escape, while much of the fine solids remain and are intertwined with the coarse solids in a concentrated slurry.

In one example rotary screen separator of the present invention, the liquid escaping from or removed while the feed material moves through the fine portion comprises less solid content than the liquid escaping from or removed while the feed material moves through the coarse portion. The liquid removed in the fine portion and the liquid removed in the coarse portion define first and second filtrate streams, respectively. The separator of the present invention may be configured such that the first and second filtrate streams exit or are removed from the separator by way of separate discharge ports should an operator wish to keep the filtrate streams separated for later processing.

Figure 1:
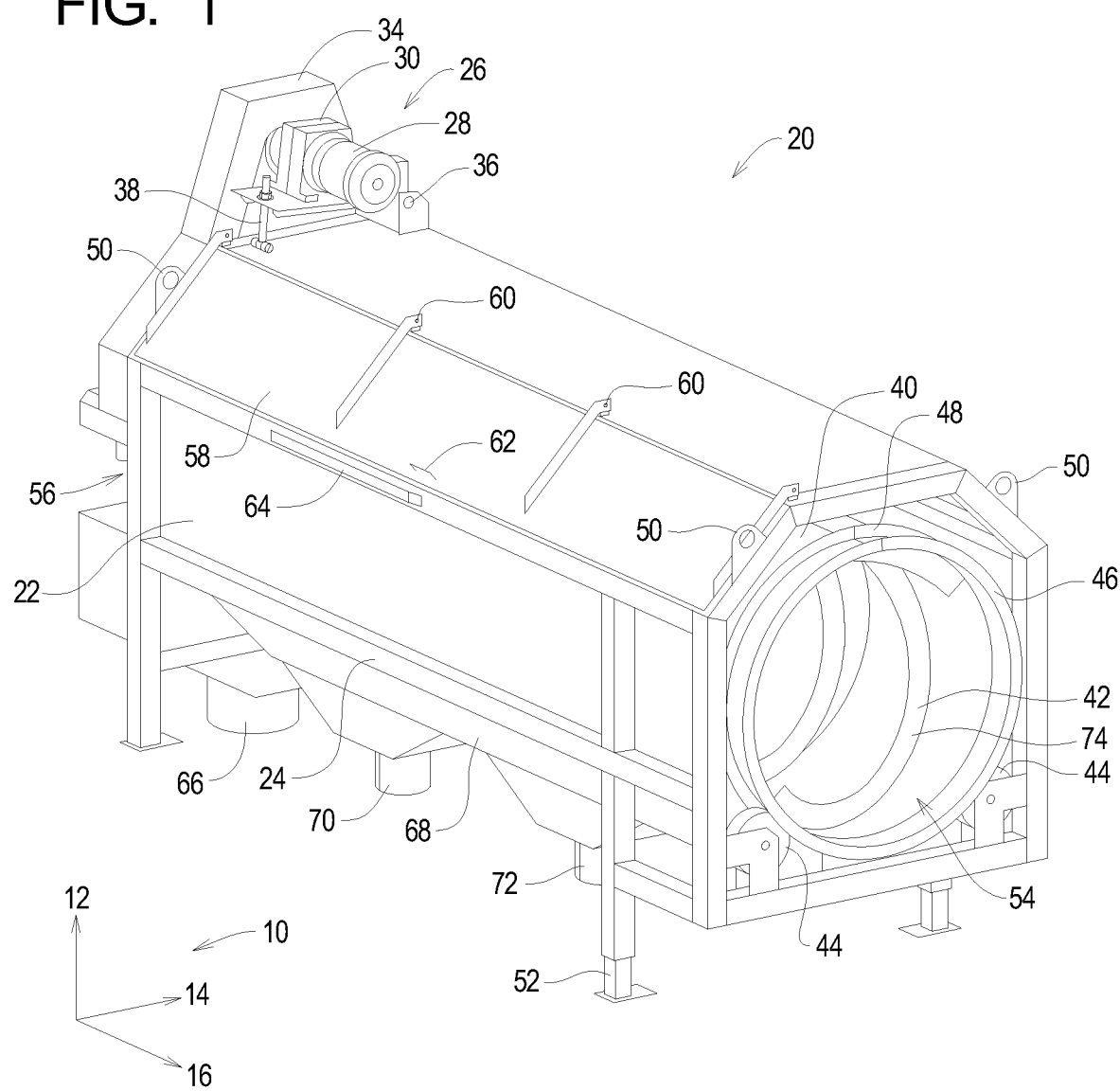
FIG. 1 is a perspective view from the output port end of a first example rotary screen separator of the invention.

Depicted in FIG. 1 is an axes system 10 comprising a vertical axis 12, a transverse axis 14, and a longitudinal axis 16. The axes system 10 is to be used for description of the embodiments and is not per se part of the present invention.

Figure 2:
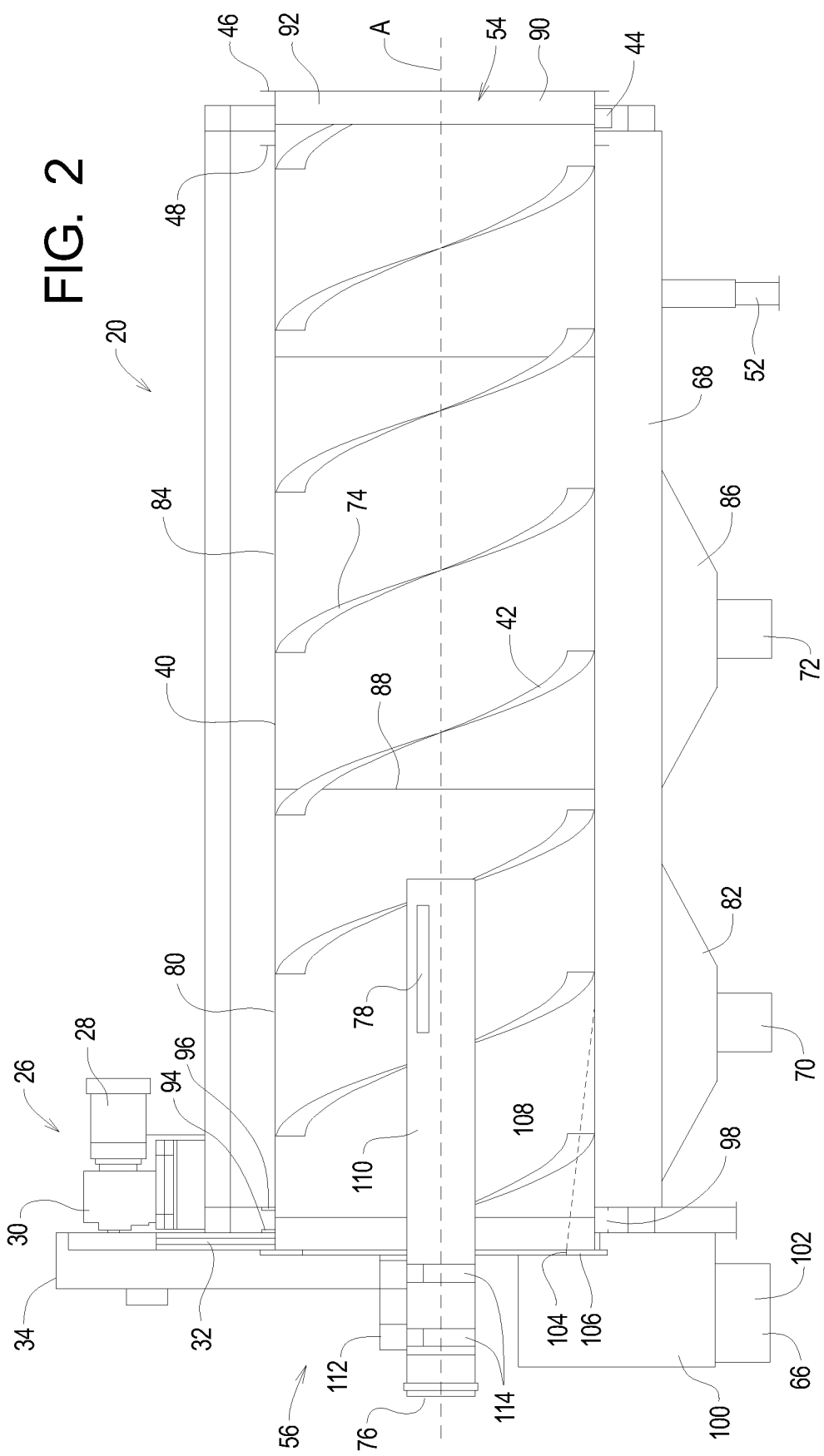
FIG. 2 is a cutaway side view of the first example rotary screen separator.

FIGS. 1 and 2 illustrate that an example hybrid rotary screen separator 20 of the present invention defines a system longitudinal axis A and generally comprises three major assemblies. The first assembly comprises a housing 22 and a frame 24. This housing and frame assembly generally supports and encloses the working portions of the separator 20.

The second assembly is the drive assembly 26 which generally comprises a drive motor 28, an optional reduction gear system 30, and a drive belt 32 which is shown in FIG. 2. In FIG. 1, the drive belt 32 is covered by a protective shroud 34. The motor 28 may be coupled to the housing 22 through a motor pivot 36 and drive tension adjuster 38.

The third assembly generally comprises a rotating screen 40. As will be described in further detail below, the example rotating screen 40 includes at least two different perforation regions. The example rotating screen 40 also comprises at least one vane 42. In one form, the rotating screen 40 is substantially cylindrical. The rotating screen 40 may be driven by the drive assembly 26 and in one form rests upon a plurality of support rollers 44. The support rollers 44 may be held in place, as shown for example in FIG. 1, by an outer flange 46 and an inner flange 48. Additional components, including additional support rollers 44, will be described below with reference to FIGS. 2 and 5 at the opposite longitudinal end of the separator 20.

To increase the portability of the separator 20, a plurality of lifting eyes 50 may be provided to facilitate connection of the separator 20 to a crane or the like (not shown) for moving and transportation thereof. Furthermore, a plurality of elevation adjusters 52 may be provided to allow the end user to adjust the elevation of the solid output end 54 relative to the input end 56.

The example separator 20 further comprises an access door 58 in the housing 22. The example access door 58 pivots between open and closed positions about a plurality of access door pivots 60 to facilitate access to the interior portion of the housing 22. A handle 62 may be provided for to facilitate lifting of the access door 58. The example access door 58 is further provided with a lid holder 64. The lid holder 64 may be rotated from a storage position as shown in FIG. 1 to a bracing position in which the lid holder 64 forms a strut that supports the access door 58 in an open configuration.

Several ports are formed on the lower portion of the separator 20. One such port is a bypass outflow port 66, which will be described in further detail below. A collection pan 68 may be provided at a bottom portion of the separator 20 to receive at least a portion of the fluid output from the rotating screen 40. The example collection pan 68 defines a fine material output 70 and a coarse material output 72 corresponding to the first and second filtrate streams, respectively, generally described above. As will be described in further detail below, the fluid output of or removed from the rotating screen 40 may be diverted to one of the fine material output 70 and the coarse material output 72.

Referring now to FIG. 2, depicted therein is a cut away view of the example separator 20 taken through the drive motor 28 and along the longitudinal axis 16 and vertical axis 12. FIG. 2 further illustrates that the vanes 42 form a screw flight 74.

As generally discussed above, the example rotating screen 40 generally comprises at least two unique perforation regions. The example rotating screen 40 comprising two separate and distinct perforation regions; however, more than two unique perforation regions can also be utilized.

Figure 3:
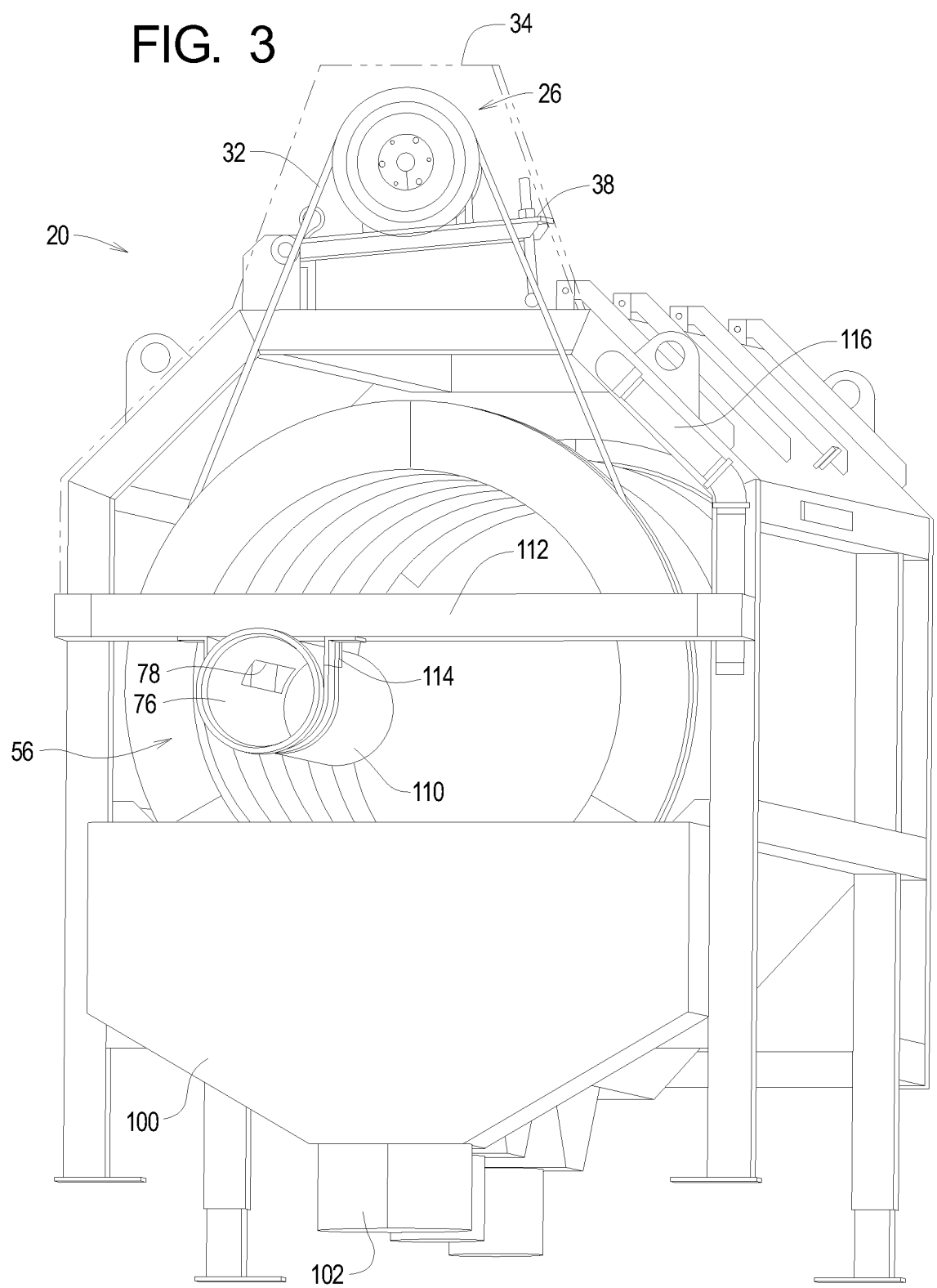
FIG. 3 is a perspective view from the input end of the first example rotary screen separator.
Figure 4:
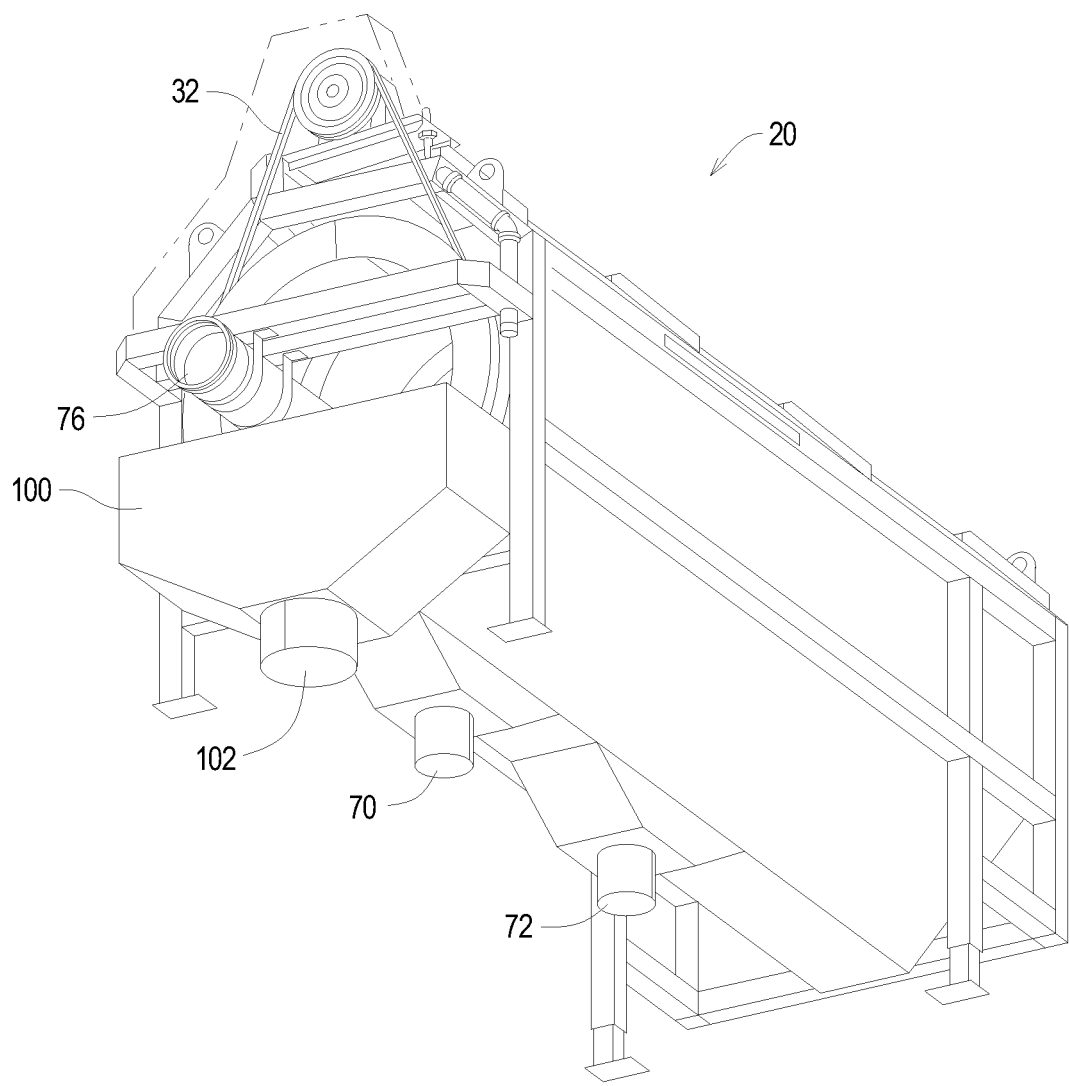
FIG. 4 is a perspective view of the underside of the first example rotary screen separator from a first perspective.

As feed material enters an example input port 76, the feed material is pressed towards a feed slot 78 (FIGS. 2 and 3). The feed material eventually exits the feed slot 78 into a fine perforation region 80 within the rotating screen 40. A portion of the liquid and some of the fine materials exit the interior of the rotating screen through the perforations in this fine perforation region 80. The material passing through the fine perforations generally redistribute toward a fine collection pan 82 and exit through the fine material output 70.

Coarser materials in the feed material that are not removed by the rotating screen 40 in the fine perforated region 80, along with fluid remaining in the feed material, are displaced away from the input port 76 by the screw flight 74 as the rotating screen 40 rotates about the longitudinal system axis A. The coarser material and liquid remaining in the feed material is thus displaced or otherwise redistributed toward the output end 54 and thus enters a coarse perforation region 84. More of the fluids and a portion of the coarser materials remaining in the feed material exit through the perforations in the coarse perforation region 84 and are collected in the collection pan 68. The coarse materials in one form reposition into the coarse collection pan 86, wherein they exit the separator 20 via the coarse material output 72.

The example rotating screen 40 is formed by two separate screens with different screen sizes, and a seam 88 is formed in the example rotating screen 40 between the fine perforation region 80 and the coarse perforation region 84. Alternatively, the cylinder formed by the rotating screen 40 may be formed from a single sheet of material and thus may be seamless.

A highly coarse portion of the feed material (i.e., has not exited through the perforations in either the fine perforation region 80 or the coarse perforation region 84) is displaced or redistributed toward the output end 54 and exits the separator 20 at a very coarse material output 90. Typically, the highly coarse portion of the feed material is collected at the coarse material output 90.

Adjacent to the example very coarse material output 90 are flanges 46 and 48 that support an additional set of rollers or idler wheels 44 that maintain position of the rotating screen 40 as generally described above. The region of the rotating screen 40 between the flanges 46 and 48 may comprise a solid region 92, which is generally not perforated. At the opposite end of the rotating screen 40, an outer flange 94 and inner flange 96 maintain position of the rotating screen 40 upon another set of idler wheels 98, which are also coupled to the frame 24.

This example separator 20 disclosed herein allows for feed material to be processed at a much faster and more efficient rate than current single screen separators of the same size. Tests have shown that a physical implementation of the example separator 20 having a rotating screen 40 of approximately 3 feet in diameter and 10 feet in length that rotates in a first range of approximately 6 to 8 rpm can separate or process feed material at a rate of around 600 gallons per minute. The rotating screen 40 constructed as defined above may be rotated at a rate within a second range of approximately 3-15 rpm.

Figure 8:
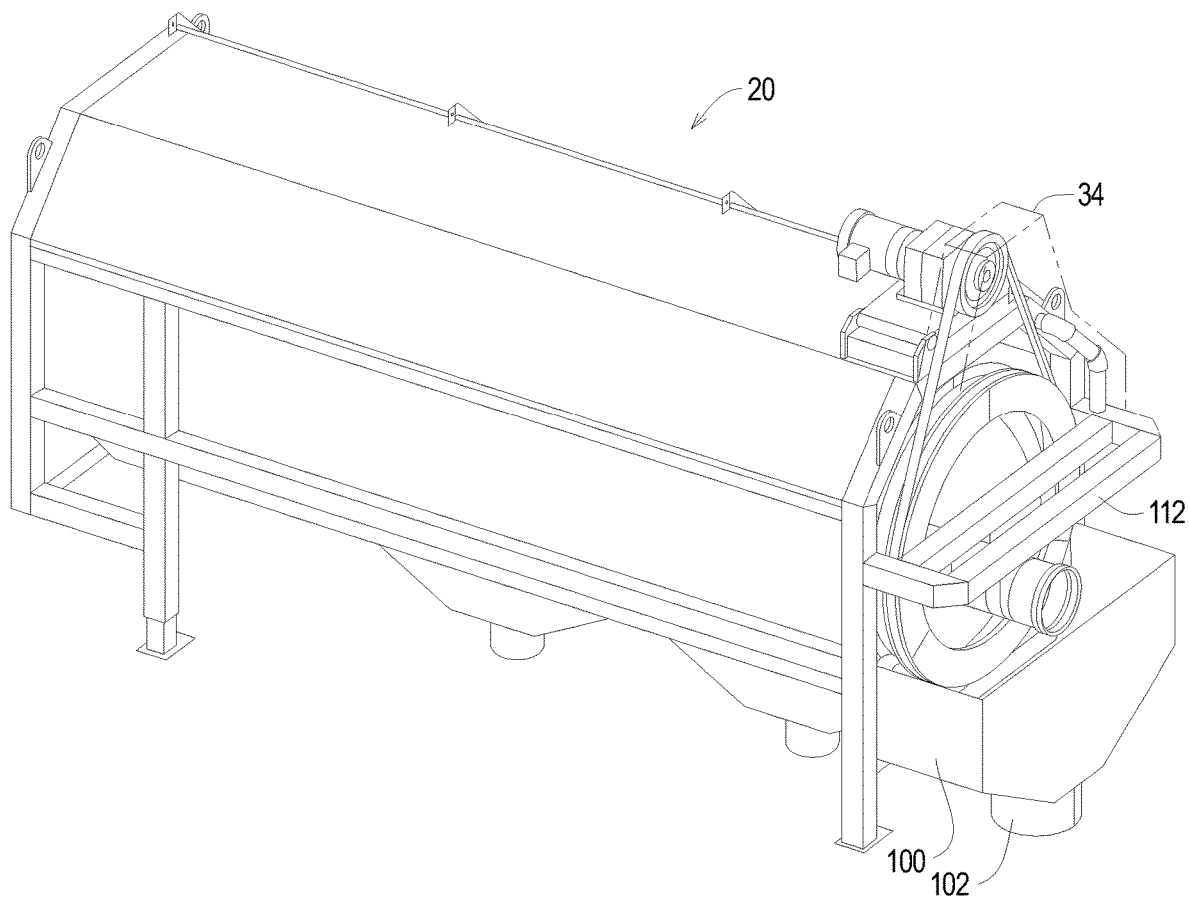
FIG. 8 is a partial hidden line view of the input end of the first example rotary screen separator.

When run at a high rate, or with very dense input material, the fluid discharge to the collection pan 68 may overwhelm the capacity of the outputs 70 and 72. In this situation, a bypass collector 100 comprising a bypass outflow 102 may be employed as perhaps best shown in FIGS. 8 and 9. The bypass collector 100 defines an upper lip 104 formed by a bypass flange 106. As material within the collection pan 68 builds up towards the input end 56 of the separator 20, material within the collection pan 68 may build up beyond a maximum fill level 108 defined by the upper lip 104 of the bypass flange 106 as shown in FIG. 2.

Figure 7:
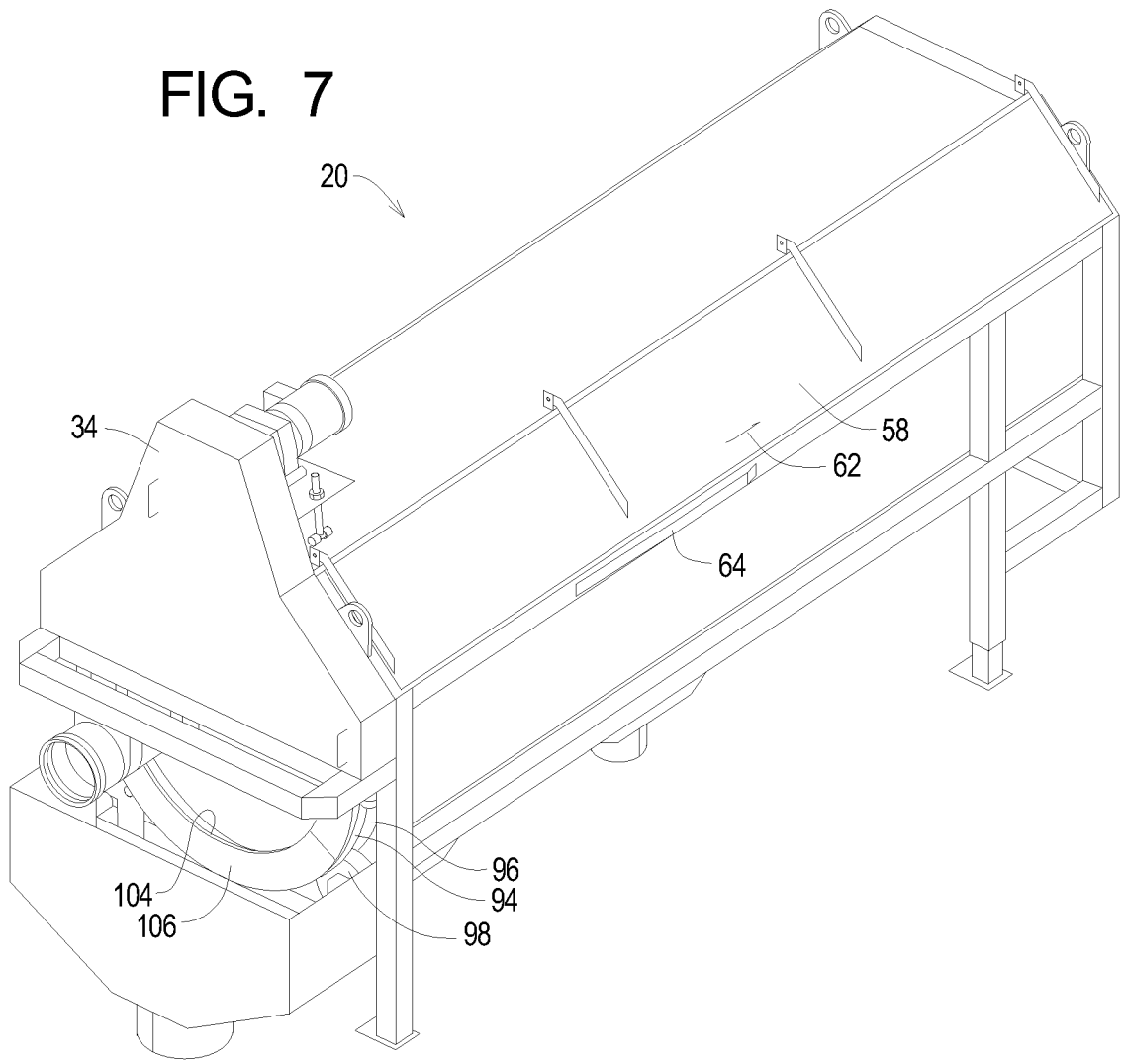
FIG. 7 is a perspective top view of the first example rotary screen separator.

As the material within the collection pan 68 exceeds the maximum fill level 108, a liquid portion of this material flows over the upper lip 104 of the bypass flange 106 and into the bypass collector 100. This bypass collector 100 is depicted in perspective in FIG. 3, and the upper lip 104 of the bypass flange 106 is visible in FIG. 7. The outflow exiting the bypass outflow 102 may be fed by way of a gravity drain or other systems and return to the source of the media to be separated, such as a settling pond.

FIG. 3 shows the input end 56 of the example separator 20 in further detail and illustrates the shroud 34 (phantom line) and the example drive tension adjuster 38 and example drive belt 32. FIG. 3 further shows that the input port 76 is defined by an input tube 110. The example input tube 110 is coupled to a cross frame member 112 in the example separator 20. The cross frame member 112 further supports the shroud 34 and the input tube 110 by way of brackets 114 and supports the inlet tube. FIG. 3 also shows a water supply line 116 which will be described in further detail below.

Figure 5:
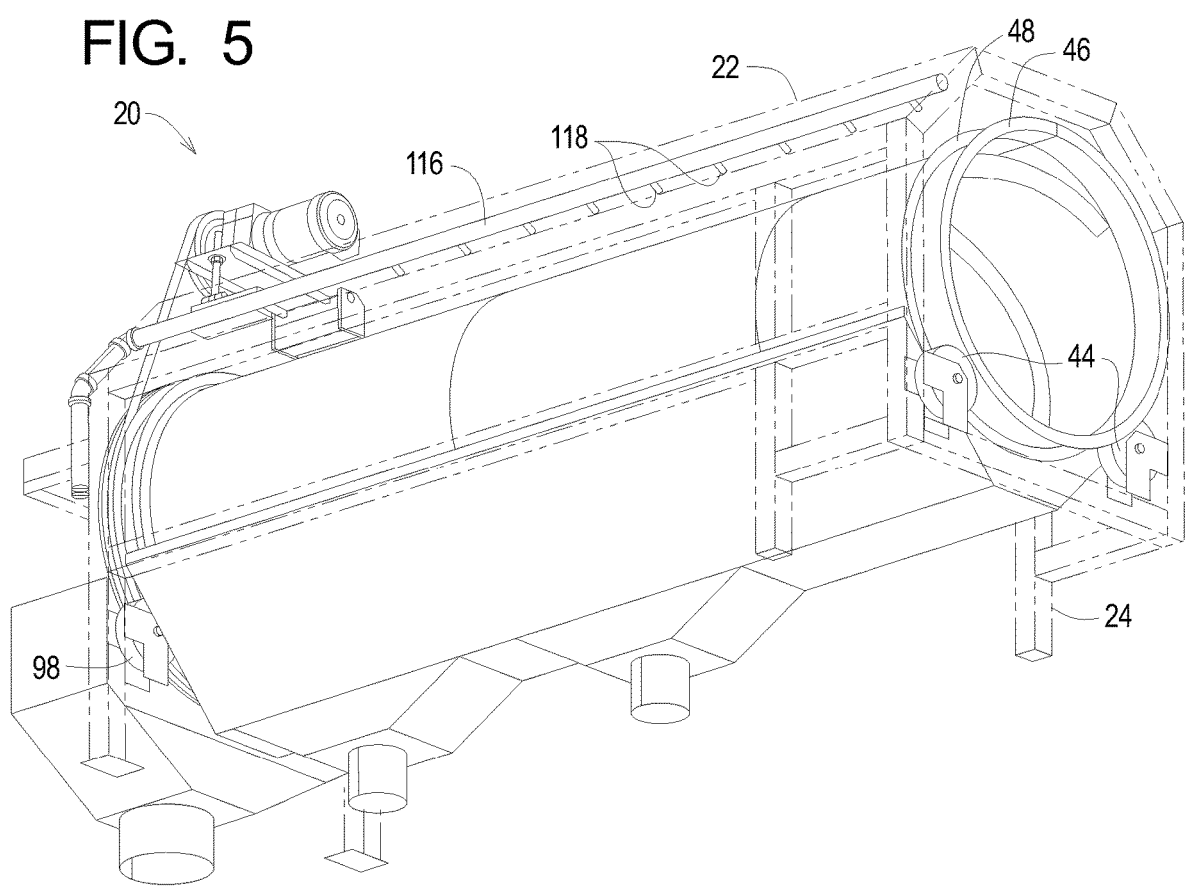
FIG. 5 is a perspective hidden line view of the underside of the first example rotary screen separator from a second perspective.
Figure 6:
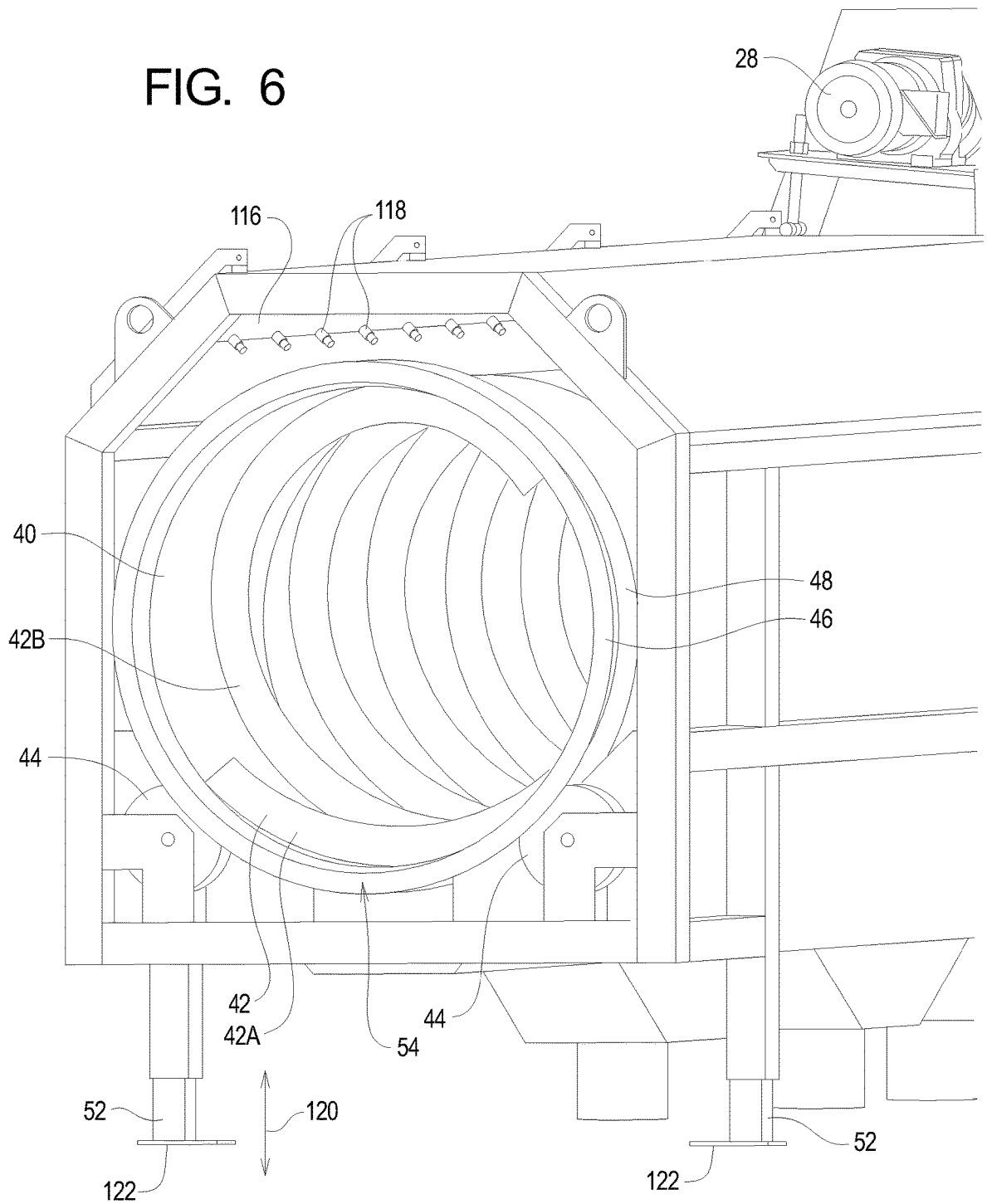
FIG. 6 is a perspective detail view of the output end of a rotary screen separator in one form.

FIG. 5 shows the example separator 20 with the housing 22 and frame 24 depicted by phantom lines to allow the support rollers or idler wheels 44 and corresponding flanges 48 and 46 to be seen more clearly. FIG. 5 further shows that the example separator 20 further comprises a water supply line 116 that is coupled to a plurality of sprinklers 118. These sprinklers 118 allow the separator 20 to be operated in a self-cleaning mode in which water from the sprinklers 118 cleans the rotating screen 40. FIG. 6 also shows the water supply line 116 and sprinklers 118, but from the output end 54. FIG. 6 also illustrates that the vanes 42 may be formed by a plurality of helical vanes 42A and 42B.

FIG. 6 also shows the elevation adjusters 52. The elevation adjusters 52 of the example separator 20 allow the output end 54 to be elevated above the input end 56 with reference to a horizontal plane. The example elevation adjusters 52 thus allow a user to vary the elevation height 120 of the output end 54 above the feet 122 of the separator 20. A slight incline of the rotating screen 40 increases the efficiency of the overall apparatus. However, the separator 20 may be configured to operate anywhere between a horizontal or level orientation (0° with respect to horizontal) or may be inclined up to 5° from horizontal. Stated alternatively, in the physical embodiment of the example separator 20 as described above (a device of 10' in overall length), the output end may raise approximately 4" above the input end.

In one form, inclining the device from horizontal improves efficiency, while an incline in a first range of substantially between 0° and 5° of a screen rotating at 3-15 rpm and having a diameter of about 3' may be preferred for common effluent consistencies although other dimensions and rates will be used in other applications. In another form, the screen 40 may be inclined at an angle in a second range of substantially between 1° and 10°.

Figure 9:
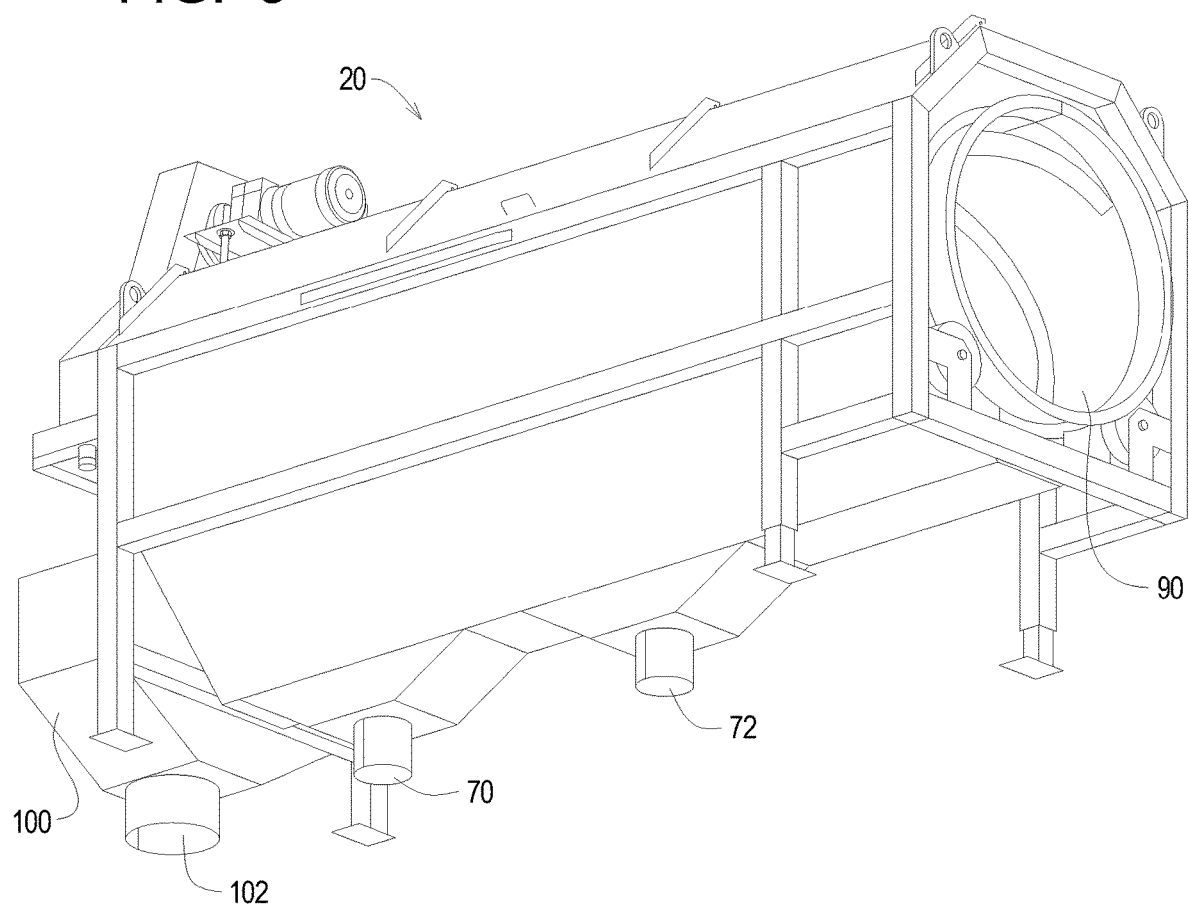
FIG. 9 is a perspective view of the underside of the first example rotary screen separator.

FIG. 9 illustrates that the example separator 20 defines four separate and distinct output ports for components or outflow material removed from the feed material. The output ports defined by the example separator 20 comprise, from left to right, the bypass outflow 102, the fine material output 70, the coarse material output 72, and the very coarse or solid material output 90. It may be desired to maintain the outflow material from each outflow port separately.

As examples, the outflow material exiting the bypass outflow 102 may be channeled back to the settling pond or other source. The fine material output 70 provides a substantially liquid media which can be used unprocessed or processed as required for a particular use. The outflow material flowing out of the coarse material output 72 contains substantially more solids than the outflow material flowing through the fine material output 70. The outflow material exiting the coarse material output 72 is thus more likely to require additional processing before this material can be reused. The outflow material exiting the very coarse material output 90 should be substantially solid and comprise a very small liquid component that can be used to the best advantage with or without additional processing as desired.

Figure 10:
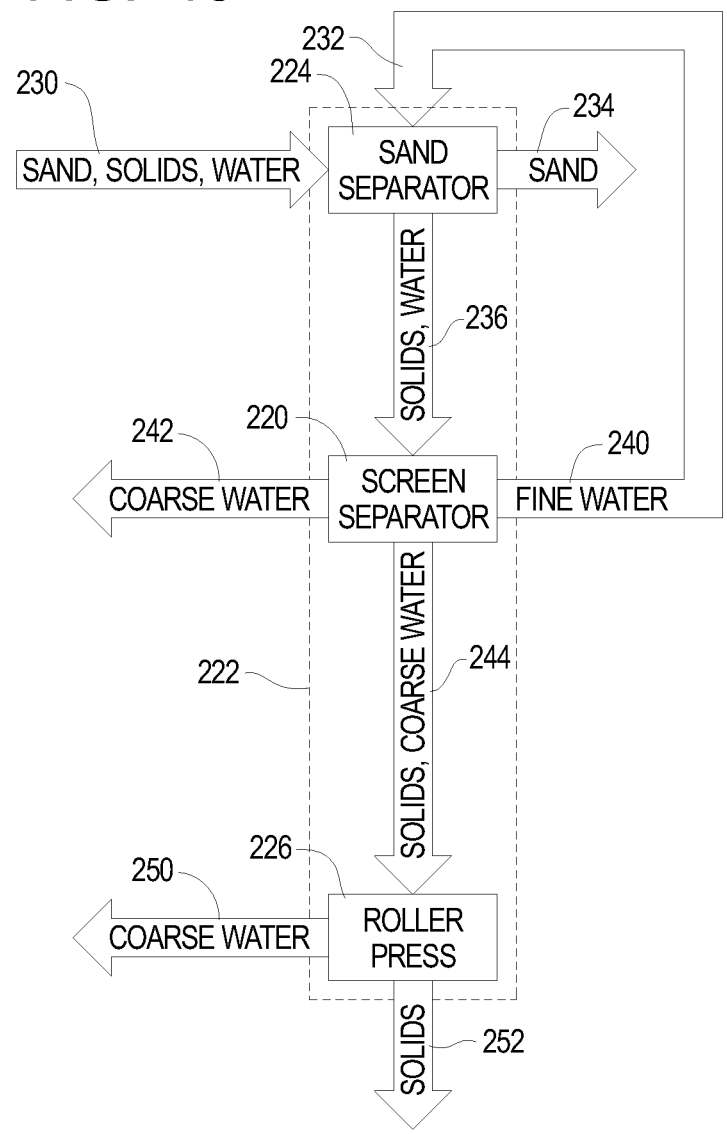
FIG. 10 is a block diagram of a first example waste processing system using a rotary screen separator of the present invention.

Referring now to FIG. 10 of the drawing, depicted therein is a second example hybrid rotary screen separator 220 of the present invention used as part of a first example waste processing system 222. The example hybrid rotary screen separator 220, which is depicted in further detail in FIG. 11, may be constructed to operate in a manner similar to that of the first example hybrid rotary screen separator 20 described above. The first example waste processing system 222 is described herein by way of example only, and the screen separator 220 may be used as described herein in many configurations of waste processing systems.

The principles of the present invention are of particular significance in the context of processing waste materials that are the byproduct of animal husbandry operations such as dairy farms, and that application of the present invention will now be described in further detail with reference to FIGS. 10 and 11.

Referring initially to FIG. 10 of the drawing, it can be seen that the first example waste processing system 222 comprises, in addition to the screen separator 220, a sand separator 224 and a roller press 226. The sand separator 224 may be a sand separator such as that described in copending U.S. patent application Ser. No. 13/351,214. The roller press 226 is or may be a conventional roller press available for use in the example waste processing system 222 as described herein.

The first example waste processing system 222 operates basically as follows. A first material 230 comprising sand, solids, and water is input to the sand separator 224. In a dairy operation, the first material 230 often contains sand because sand may be used as a bedding material for the cows. The water portion of the first material may be from rinse water, urine, or other water-based liquids used in a dairy operation. The solids are typically manure and uneaten food such as corn. Cleaning of dairy facilities creates a constant need to process the first material 230 so that its components may be reused, recycled, further processed, and/or disposed of as appropriate.

The sand separator 224 processes the first material, typically using water 232, into a second material 234 primarily comprising sand and a third material 236 primarily comprising solids and water. The second material 234 may be recycled for use as bedding material or otherwise appropriately reused or disposed of.

In the first example waste processing system 222, the third material 236 is input to the screen separator 220. The screen separator 220 processes the third material 236 to obtain a fourth material 240 commonly referred to as fine water, a fifth material 242 commonly referred to as coarse water, and a sixth material 244 primarily comprising solids and coarse water.

Fine water is a liquid that is primarily water and can be used with little or no processing in a modern dairy operation. In the first example waste processing system 222, the fourth material 240 is used as at least a portion of the water 232 used by the sand separator 224. Fine water typically has a first, relatively low, concentration of solids and/or other impurities.

Coarse water is a liquid comprising water and solids, and it is difficult to use coarse water in a modern dairy operation without additional processing. In the first example waste processing system 222, the fifth material 242 is typically stored for further processing and/or disposal as appropriate. Coarse water typically has a second, relatively high, concentration of solids and/or other impurities. The first concentration of solids associated with the fourth material 240 is thus typically significantly lower than the second concentration of solids associated with the fifth material 242.

The sixth material 244 is simply a combination of coarse water and the majority of the solids present in the third material 236 and has a third, very high, concentration of solids and/or other impurities. The second concentration of solids associated with the fifth material 242 is thus typically significantly lower than the third concentration of solids associated with the sixth material 244. It follows that the third concentration of solids is higher than the second concentration of solids and significantly higher than the first concentration of solids.

In the first example waste processing system 222, the sixth material 244 is input to the roller press 226. The roller press 226 processes the sixth material 244 to obtain a seventh material 250 primarily comprising fine water and an eighth material 252 primarily comprising solids, with very little liquid remaining in the eighth material 252. Like the fourth material 240, the seventh material 250 is typically appropriate for use in a dairy facility without further processing and may be used as at least a portion of the water 232 used by the sand separator 224. The eighth material 252 may be further processed by composting or in an anaerobic digester and may be reused as fertilizer and/or an energy source.

Figure 11:
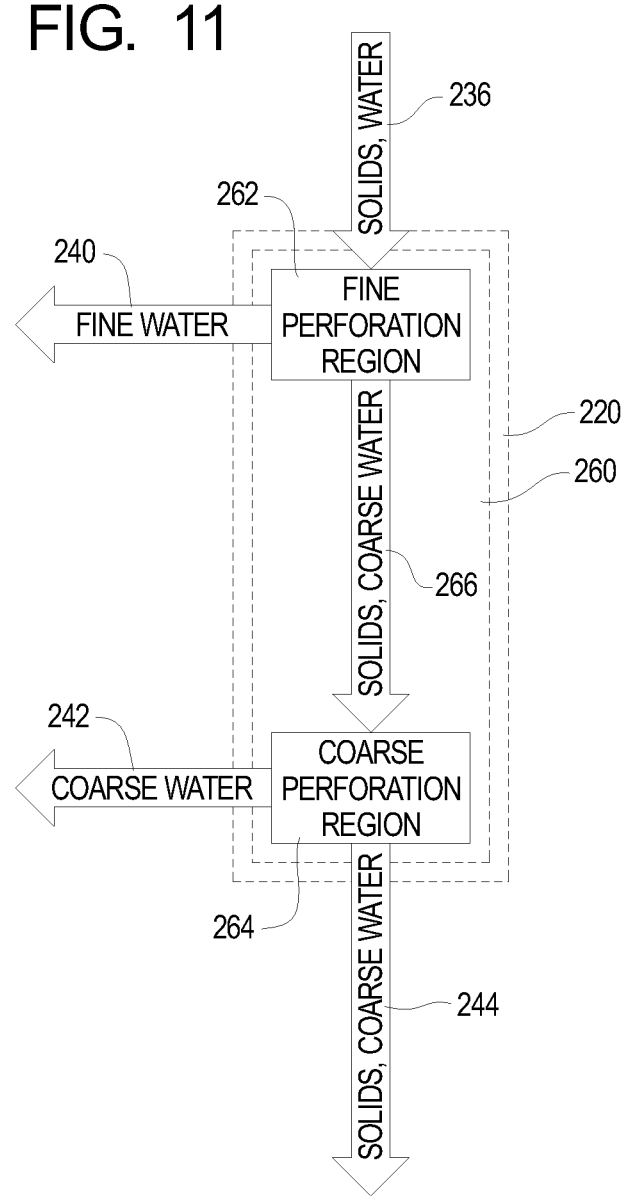
FIG. 11 is a block diagram of the rotary screen separator of the first example waste processing system.

FIG. 11 is a more detailed view of the example screen separator 220 depicted in FIG. 10. As shown in FIG. 11, the example screen separator 220 comprises a separator member or screen 260 defining a fine perforation region 262 and a coarse separation region 264.

The third material 236 is first processed by the fine perforation region 262 to obtain the fourth material 240 and a transition material 266 comprising solids and coarse water. The transition material 266 is then processed by the coarse perforation region 264 to obtain the fifth material 242 and the sixth material 244. A fourth concentration of solids associated with the transition material 266 is typically significantly higher than the first concentration of solids associated with the fourth material 240 and the second concentration of solids associated with the fifth material 242. However, the fourth concentration of solids associated with the transition material is typically significantly lower than the third concentration of solids associated with the sixth material 244.

Figure 12:
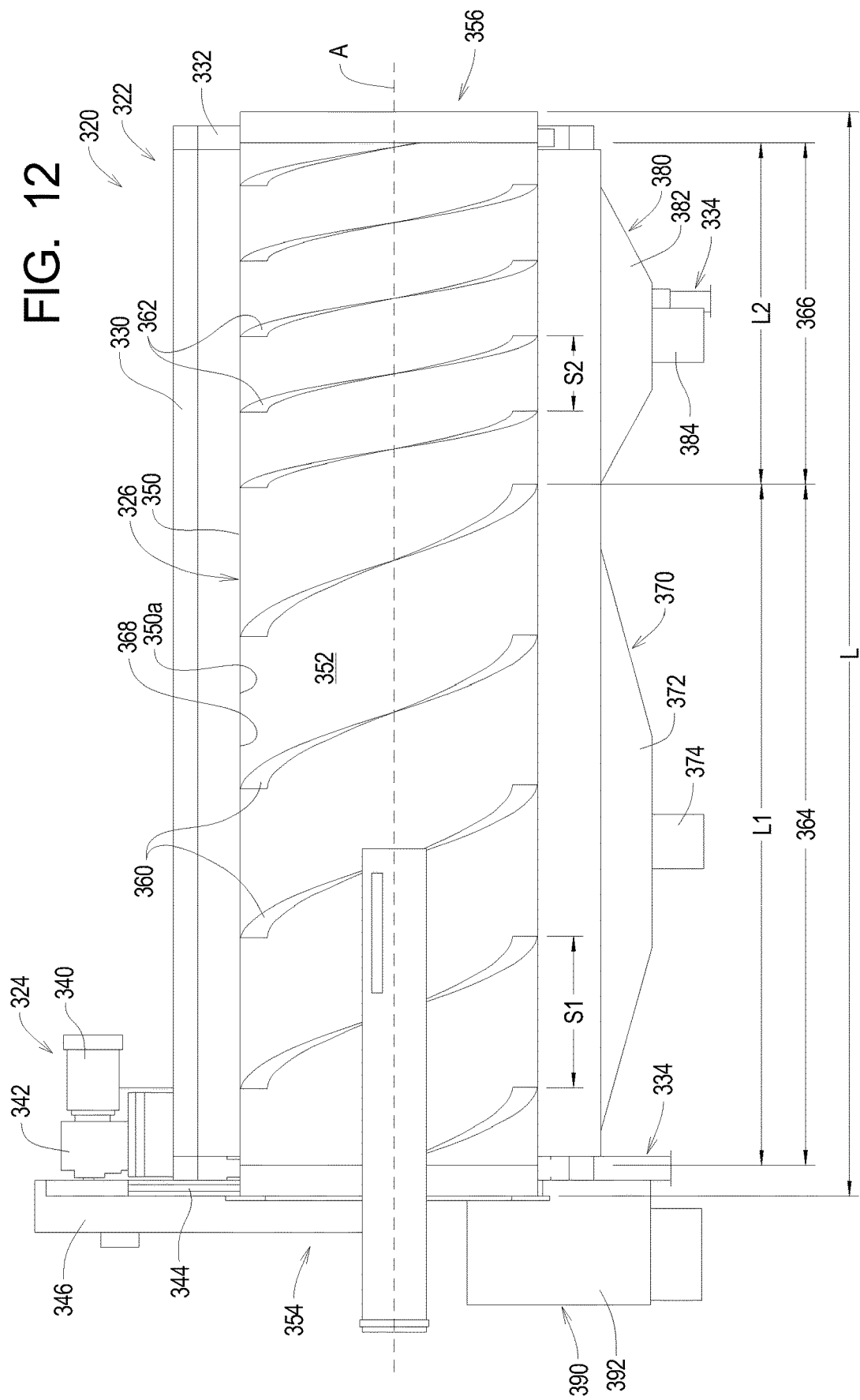
FIG. 12 is a cutaway side view of a second example rotary screen separator.
Figure 13:
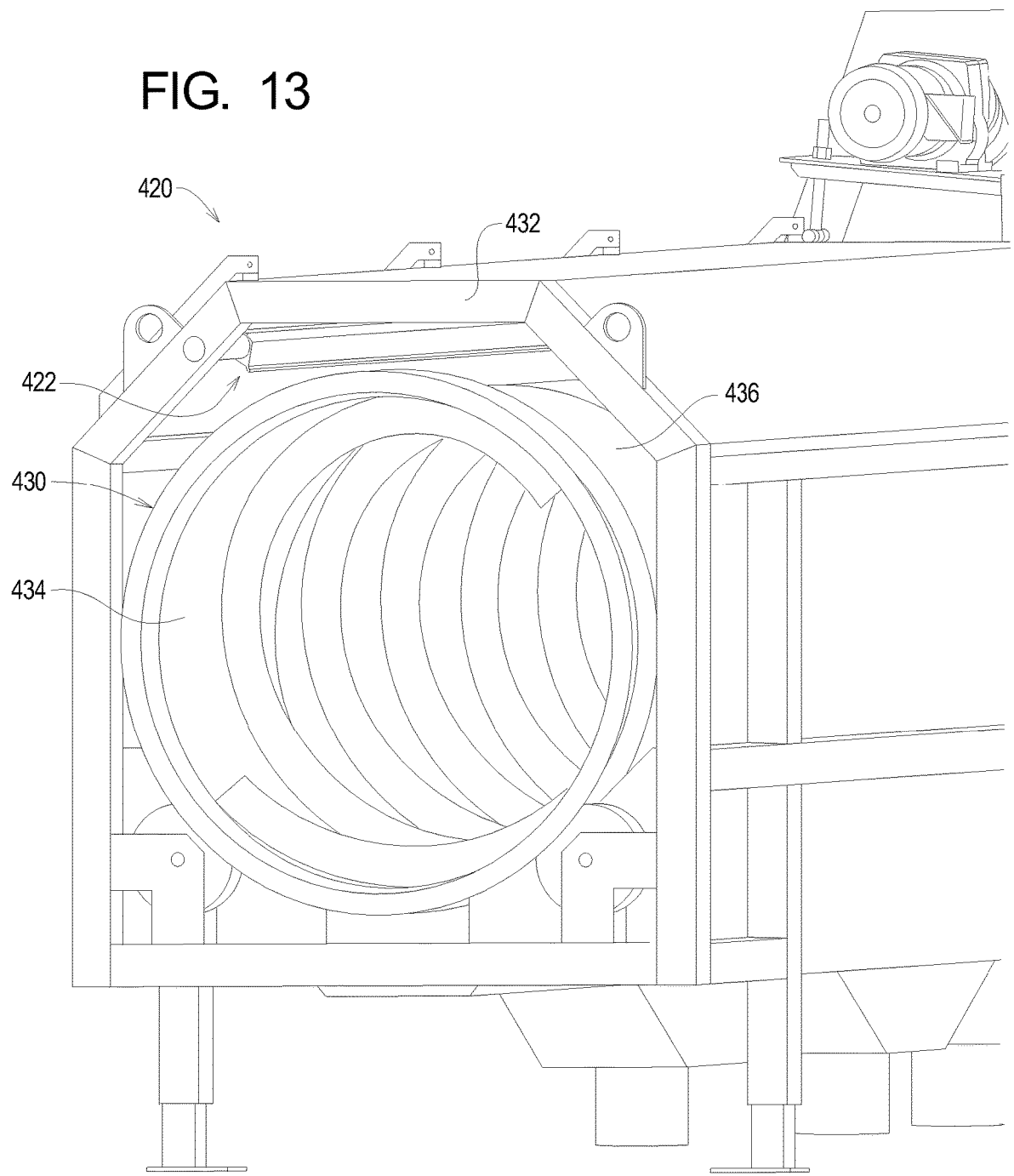
FIG. 13 is a perspective detail view of the output end of a rotary screen separator depicting a first example outlet assembly of a cleaning system for the rotary screen separator.

Turning now to FIG. 12 of the drawing, depicted at 320 therein is another example hybrid rotary screen separator system constructed in accordance with, and embodying, the principles of the present invention. The example separator system 320 defines a system longitudinal axis A and an overall length L. The example separator system 320 comprises a housing assembly 322, a drive system 324, and a screen assembly 326.

The housing assembly 322 comprises a housing 330, a frame 332, and one or more adjustment assemblies 334. This housing 330 encloses the working portions of the separator system 320, and the frame 332 supports the housing 330, the drive system 324, and the screen assembly 326 as will be described in further detail below. The housing 330 and frame 332 may be similar to or the same as the housing 22 and frame 24 described above and will not be described again in detail.

The example drive system 324 comprises a drive motor 340, an optional reduction gear system 342, and a drive belt 344. The drive system 324 may be similar to or the same as the drive assembly 26 described above. In particular, the drive belt 344 may be covered by a protective shroud 346, and the motor 340 may be coupled to the housing 330 through a motor pivot (not shown in FIG. 12) and drive tension adjuster (not shown in FIG. 12). The example drive system 324 will not be described in detail herein again.

The example screen assembly 326 comprises a screen structure or separator member 350 defining a separator chamber 352 having an input end 354 and an output end 356. The example screen structure 350 is substantially cylindrical, and a longitudinal axis of the screen structure 350 is aligned with the system axis A. Operation of the drive assembly 324 thus causes axial rotation of the screen structure 350 about the system axis A. The adjustment assembly or assemblies 334 allow adjustment of a height of the input end 354 relative to a height of the output end 356. Typically, the output end 356 will be higher than the input end 354.

The example screen assembly 326 further comprises first and second vane structures 360 and 362. A first perforation region 364 having a first perforation configuration is associated with the first vane structure 360, and a second perforation region 366 having a second perforation configuration is associated with the second vane structure 360. The first perforation configuration comprises a plurality of holes in the screen structure 350 that are sized, shaped, and spaced relative to each other to allow relatively fine particulate materials and liquids to pass from the separator chamber 352 to the exterior of the screen structure 350. The second perforation configuration comprises a plurality of holes in the screen structure 350 that are sized, shaped, and spaced relative to each other to allow relatively coarse particulate materials and liquids to pass from the separator chamber 352 to the exterior of the screen structure 350. As one example, relatively fine particulate materials may pass through an opening less than approximately 1 millimeter, while relatively coarser particulate materials may pass through an opening of approximately 10 millimeters.

The example first vane structure 360 defines a first spacing S1 and first length L1, and the second vane structure 362 defines a second spacing S2 and a second length L2. The first and second spacings S1 and S2 define a distance along the system axis between longitudinally and radially adjacent points on the vane structures 360 and 362. The first and second lengths L1 and L2 define an overall length of the vane structures 360 and 362, respectively, and may be expressed in nominal terms or as a percentage of the overall length L of the separator chamber 352. The first spacing S1 is typically greater than the second spacing S2.

The example first and second vane structures 360 and 362 are rigidly connected to an inner surface 368 of the screen structure 350. In particular, the example vane structures 360 and 362 are one or more sets of helical screw blades that extend radially inwardly from the screen structure inner surface 350a. As an alternative, the vane structures may be implemented as one or more sets of helical screw blades that extend radially outwardly from a shaft coaxially aligned with the screen structure 350.

The example vane structures 360 and 362 are each comprised of two continuous, offset screw blades, but it is also possible that the screw blades of one or both of these structures 360 and 362 may be made of discrete, discontinuous blade components. Additionally, a trailing edge of the blades of the example first vane structure 360 is contiguous with a leading edge of the blades of the second vane structure 362, but these structures 360 and 362 may be dis-contiguous with each other. In any arrangement, the purpose of the vane structures 360 and 362 is to displace material along the separator chamber 352 from the input end 354 to the output end 356 as will be described in further detail below.

Arranged below the screen assembly 340 are a first collection structure 370 defining a fine material chamber 372 in fluid communication with a fine material output port 374 and a second collection structure 380 defining a coarse material chamber 382 in fluid communication with a coarse material output port 384. Optionally, a single collection structure defining a single material output port may be arranged under the screen assembly. An overflow collection structure 390 defining an overflow material chamber 392 in fluid communication an overflow output port is arranged to collect liquids overflowing the fine material chamber 372.

The fine material chamber 372 is arranged below the first perforation region 364 of the screen structure 350 and is associated with the first filtrate stream generally described above. The coarse material chamber 382 is arranged below the second perforation region 366 of the screen structure 350 and is associated with the second filtrate stream generally described above. In particular, at least a portion of fluid material displaced along the separator chamber 352 by the vane structures 360 and 362 is diverted to the fine material output port 374 and the coarse material output port 384 to form the first and second filtrate streams, respectively.

The example hybrid rotary screen separator system 320 operates generally as follows. The drive system 324 is operated to cause axial rotation of the screen structure 350 and the vane structures 360 and 362 supported by the screen structure 350. Feed material is introduced into the separator chamber 352 through the input end 354. The first vane structure 360 displaces the feed material along the first perforation region 364 of the screen structure 350, and the second vane structure 362 displaces the feed material along the second perforation region 366 of the screen structure 350.

As the feed material is displaced through the separator chamber 352 along the first perforation region 364 of the screen structure 350, fine materials and liquids pass through the perforations in the screen structure 350 and are collected in the fine material chamber 372. Materials and liquids collected by the fine material chamber 372 pass through the fine material output port 374 for further processing as generally described above.

As the feed material continues through the separator chamber 352 and into the second perforation region 366 of the screen structure 350, coarser materials and liquids pass through the perforations in the screen structure 350 and are collected in the coarse material chamber 382. Materials and liquids collected by the coarse material chamber 382 pass through the fine material output port 384 for further processing as generally described above.

Liquids, primarily water, and some solids that have not passed through screen structure 350 in the perforation regions 364 and 366 will exit the separator chamber 352 through the output end 356 thereof. In practice, most of the solids passing through the separator chamber 352 collect at the bottom of the screen structure 350 in a wad or mat that is churned or rotated as the screen structure 350 rotates.

In the example separator system 320, the spacings S1 and S2 associated with the vane structures 360 and 362 are different, with the spacing S1 being greater than the spacing S2 as described above. The first vane structure 360 will thus displace material through the separator chamber 352 at a first material displacement rate that is greater than a second material displacement rate associated with the second vane structure 362. The first and second material displacement rates associated with the first and second vane structures 360 and 362 mean that the feed material moves more quickly along the first perforation region 364 than across the second perforation region 366.

As discussed above, the first perforation pattern associated with the first perforation region 364 allows liquids and finer particulate material to pass through the screen structure 350. The first material displacement rate is thus predetermined based on the first spacing S1 and the rate at which the screen assembly 326 is rotated as appropriate for the characteristics of the feed material and the first perforation pattern. Similarly, the second perforation pattern associated with the second perforation region 366 allows liquids and more coarse particulate material to pass through the screen structure 350. The second material displacement rate is thus predetermined based on the second spacing S2 and the rate at which the screen assembly 326 is rotated as appropriate for the characteristics of the feed material and the second perforation pattern.

In practice, the first material displacement rate may be high relative to the second material displacement rate and still allow much of the liquid and fine particulate material to be removed from the feed material along the first perforation region 364. After the feed material has moved along the first perforation region 364, however, much of the liquid and fine particulate material has been removed from the feed material.

Predetermining the second material displacement rate such that it is less than the first material displacement rate allows the material more time within the second perforation region 366. The second material displacement rate thus allows more of the remaining liquid and the coarse particulate material to be removed through the second perforation region 366 of the screen structure 350. The use of two different material displacement rates thus allows an overall length L of the system 320 to be kept to a minimum.

While the example hybrid rotary screen separator 320 employs two different perforation regions 364 and 366 and associated collection chambers 370 and 380, more than two different stages each comprising a perforation region and collection chamber may be provided for a particular operating environment. In this case, the spacings associated with each of the vane structures and the perforation patterns associated with each of the perforation regions would be predetermined to remove more particulate material of three different maximum sizes from the feed material. Typically, but not necessarily, the size of the particulate material will increase and the material displacement rate will decrease during each successive stage.

In addition, although the example hybrid rotary screen separator 320 employs two different perforation regions 364 and 366 with two different mesh sizes, a significant portion of the benefits of the use of two different regions can be obtained using a single mesh size. By the time the material being process passes from the first perforation region 364 to the second perforation region 366, much of the water within the processed material has been removed. The relatively smaller spacing between each of the adjacent vane structures in the second perforation allow the more time for the relatively smaller volume of fluid by percentage in the processed material within the second perforation region 366 to pass through the perforations, regardless of the size of the perforations relative to those of the first perforation region.

Referring now to FIGS. 13-18, depicted therein is a rotary screen separator 420 comprising a first example cleaning system 422. The example rotary screen separator 420 may be any screen separator such as the example hybrid rotary screen separators 20, 220, and 320 described above, and the rotary screen separator 420 will not be described herein beyond that extent helpful for a complete understanding of the operation of the cleaning system 422. As is conventional, the example rotary screen separator 420 comprises a screen 430 supported for rotation relative to a frame 432. Further, the screen 430 defines an inner surface 434 and an outer surface 436, and holes 438 formed in the screen 430 extend between the inner surface 434 and the outer surface 436. At least one flight of vanes 439 extend from the inner surface 434 towards an interior of the screen 430. The vanes 439 define a maximum vane depth VDM which in turn defines a depth plane DP generally corresponding to a height of material being processed within the rotary screen separator 420.

Figure 18:
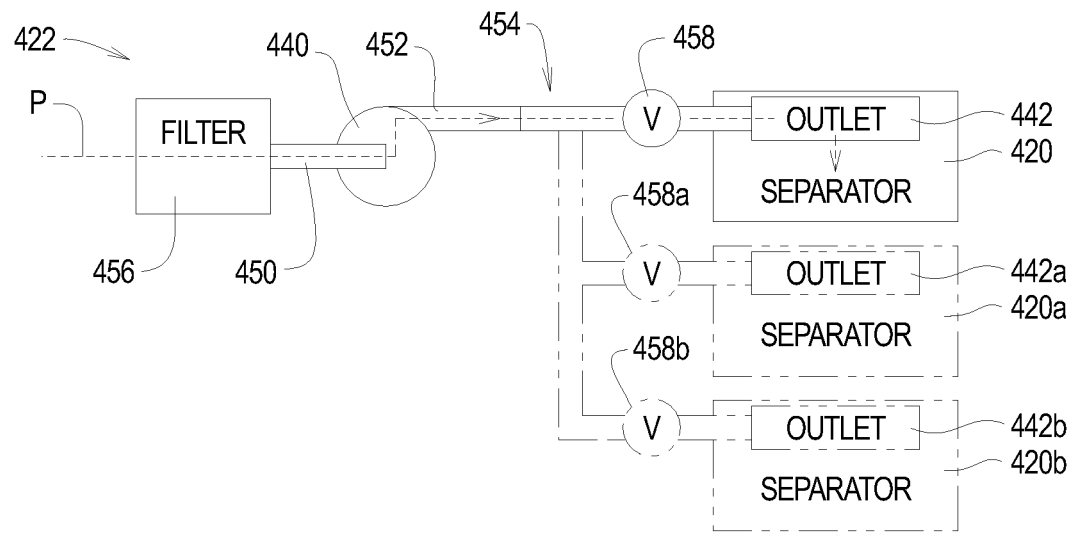
FIG. 18 schematically depicts an example cleaning system employing an outlet assembly such as the first example outlet assembly described herein.

As perhaps best shown in FIG. 18, the first example cleaning system 422 comprises a blower 440 and one or more outlet assemblies 442. The example blower 440 comprises a blower inlet 450 and a blower outlet 452. A conduit system 454 is arranged to connect the blower outlet 452 to the outlet assembly or assemblies 442.

The first example cleaning system 422 further optionally comprises a blower filter 456 and one or more gate valves 458. The blower filter or filters 456 and gate valve or valves 458 are or may be conventional and will not be described herein in further detail. The gate valve or valves 458 may be manually operated or may be controlled by an electrical, pneumatic, hydraulic or other control system (not shown).

When the blower 440 operates, air is drawn along a flow path P extending through the blower filter 456, the blower inlet 450, the blower outlet 452, the conduit system 454, and the outlet assembly or assemblies 442. The gate valve or valves 458 are configured to prevent flow of fluid along the flow path P when in a closed configuration and to allow the flow of fluid along the flow path P when in an open configuration. In the first example cleaning system 422, each gate valve 458 is arranged between the conduit system 454 and one of the outlet assemblies 442.

FIG. 18 illustrates that the first example cleaning system 422 may be used with more than one rotary screen separator. In FIG. 18, the example rotary screen separator 420 is indicated in solid lines, while optional second and third rotary screen separators 420a and 420b are indicated in broken lines. When the first example cleaning system 422 is used to clean only the rotary screen separator 420, only the outlet assembly 442 is used. When the first example cleaning system 422 is further used to clean the optional second and third rotary screen separators 420a and 420b, the conduit system 454 further connects the blower outlet 452 to second and third outlet assemblies 442a and 442b through optional second and third gate valves 458a and 458b.

Referring now more specifically to FIGS. 13-17, the construction details of the first example outlet assembly 442 will be described in further detail. If used, the optional second and third outlet assemblies 442a and 442b may be similar to the first example outlet assembly 442, and the second and third outlet assemblies 442a and 442b will not be described in further detail herein.

Further, although not depicted in FIGS. 13-17, multiple outlet assemblies 442 may be employed with a single rotary screen separator. When multiple outlet assemblies 442 are used with a single rotary screen separator, the outlet assemblies 442 may be angularly spaced about the system axis A1 and/or multiple outlet assemblies 442 may be located at the same angular location but spaced along the length of the system axis A1.

Figure 15:
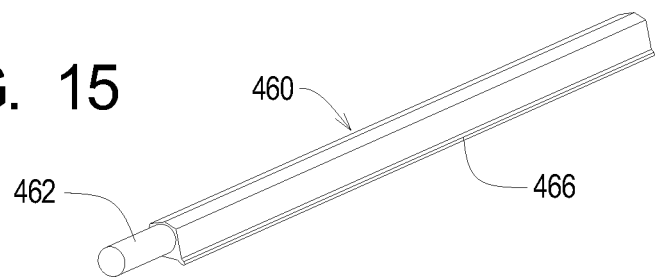
FIG. 15 is a perspective view illustrating the first example outlet assembly.
Figure 17:
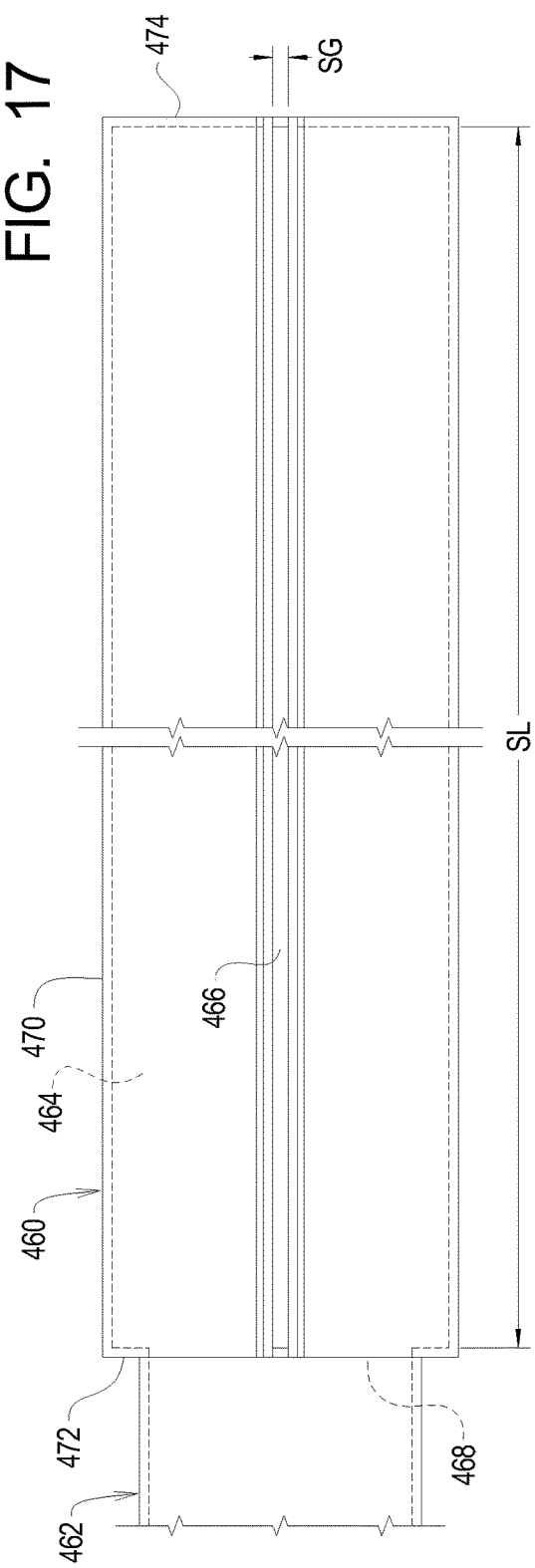
FIG. 17 is an elevation view looking along a plane extending through an outlet slot defined by the first example outlet assembly.

As perhaps best shown in FIGS. 15 and 17, the example outlet assembly 442 comprises a housing structure 460 and an inlet fitting 462. The example housing structure 460 defines a housing chamber 464 and an outlet slot 466. The inlet fitting 462 defines an inlet opening 468. In use, the inlet fitting 462 is connected to the conduit system 454 such that air flows from the conduit 454, through the inlet opening, and into the housing chamber 464. As will be described in further detail below, air flowing into the housing chamber 464 flows out of the housing structure 460 through the outlet slot 466 and impinges the screen 430. As shown in FIG. 17, the outlet slot 466 defines an outlet slot length dimension SL and an outlet slot gap dimension SG.

The stream of air impinging on the screen 430 removes debris from both the inner surface 434 and the outer surface 436 of the screen 430. The use of air to clean or otherwise remove debris from the screen significantly reduces the amount of liquid (e.g., water) required for operation of the rotary screen separator 420. Further, the use of the blower 440 to create a steady stream of relatively low pressure air is significantly more efficient than the use of water and/or compressed air.

The example housing structure 460 comprises a housing wall 470 and proximal and distal end walls 472 and 474. The example inlet fitting 462 is rigidly connected to, and the inlet opening 468 is formed in, the proximal end wall 472. The outlet slot 466 extends along the length of the housing wall 470 from adjacent the proximal end wall 472 to adjacent the distal end wall 474. The example housing wall 470 is formed by first and second housing members 475 and 476 joined together along a seam 478 and to the first and second end walls 472 and 474. Alternatively, the housing wall 470 may be formed in a single piece using other manufacturing methods, such as extrusion. As another alternative, the entire housing structure 460, and possibly the inlet fitting 462, may be cast or molded as a single piece. When extruded, cast, or molded, the outlet slot 466 may be integrally formed at the same time, or the housing structure 460 may be cut, punched, or otherwise worked to form the outlet slot 466.

Figure 16:
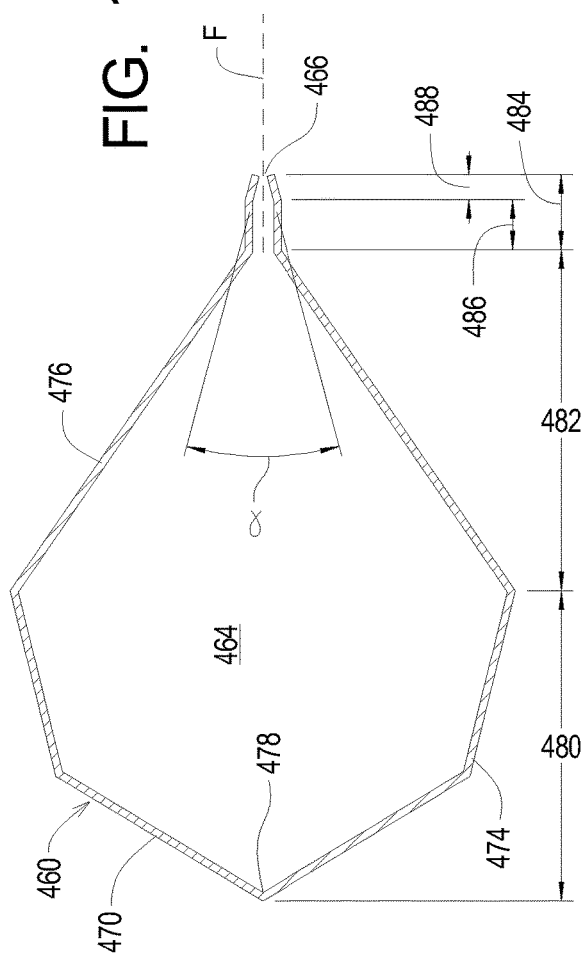
FIG. 16 is a partial section view of an end portion of the first example outlet assembly.

As perhaps best illustrated in FIG. 16, the housing chamber 464 formed by the example housing structure 460 defines a main portion 480, an intermediate portion 482, and a slot portion 484. The intermediate portion 482 extends between the main portion 480 and the slot portion 484 and narrows such that dimensions (e.g., cross-sectional area) of the housing chamber 464 are reduced in the slot portion 484 relative to the main portion 480 in the general direction that air flows out of the outlet assembly 442. Further, the slot portion 484 in turn defines a transition portion 486, an outlet portion 488, and the outlet slot 466. The transition portion 486 is in direct fluid communication with the intermediate portion 482 and the outlet portion 488, and dimensions (e.g., cross-sectional area) of the transition portion 486 are substantially constant between the intermediate portion 482 and the outlet portion 488. The outlet portion 488 is in direct fluid communication with the transition portion 486 and the outlet slot 466, and dimensions (e.g., cross-sectional area) of the transition portion 486 are reduced between the transition portion 486 and the outlet slot 466. An angle α is thus defined by inner surfaces of the housing structure 460 on either side of the juncture between the transition portion 486 and the outlet portion 488. The transition portion 486 and outlet portion 488 define a flow plane F as shown in FIG. 16.

The geometry of the housing structure 460 is designed both to increase the flow rate of air flowing along the flow path P near the outlet slot 466 and to direct the air flowing out of the outlet slot 466 along the flow plane F. In particular, air flows out of the outlet slot 466 in a flow stream S (FIG. 14). The flow stream S defines a flow direction and a flow rate. The flow direction of the air forming the flow stream S is primarily defined by dimensions of the slot portion 484 and, at least initially, extends along the flow plane F. The flow rate of the air forming the flow stream S is primarily defined by a source flow rate of air entering the housing chamber 464 and by the dimensions of the outlet slot 466.

As perhaps best shown in FIG. 14, the example outlet assembly 442 is secured to the frame 432 such that the flow stream S is directed at the outer surface 436 of the screen 430. At least a first portion of the air forming the flow stream S will remove at least a portion of any debris on the outer surface 436. Further, at least a second portion of the air forming the flow stream S will pass through the openings 438 in the screen 430 and remove at least a portion of any debris on the inner surface 434 of the screen 430.

As is conventional, the screen 430 of the rotary screen separator 420 is rotated in a direction R about a screen axis A1 defined by the screen 430 as shown in FIG. 14. The flow stream S is configured such that, as the screen 430 axially rotates, the flow stream S intersects substantially the entire outer surface 436 in the circumferential dimension and in the longitudinal direction. Accordingly, the flow stream S will remove debris from substantially the entire surface area of both the inner surface 434 and outer surface 436 of the screen 430.

Further, outlet assembly 442 is arranged such that the flow plane F is directed towards the outer surface 436 of the screen 430 at an impingement angle β with respect to a line tangential to the outer surface 436 and extending through the point of intersection of the flow plane F and the outer surface 436. The flow stream S generally follows the flow plane F and thus impinges the outer surface 436 at the impingement angle β. As will be described in further detail below, the direction of the flow stream S (as generally associated with the flow plane F and/or the impingement angle β) relative to the outer surface 436 can be adjusted to enhance the ability of the flow stream S to remove debris from screen 430.

The foregoing description of the first example cleaning system 422 indicates the parameters that may be controlled to control operation of a cleaning system of the present invention include source flow rate of the source air, geometry and dimensions of the housing chamber 464, geometry and dimensions of the outlet slot 466, and angle β at which the flow stream S (or flow plane F) extends relative to the outer surface 436 of the screen 430. These parameters will be determined for a particular rotary screen separator. In particular, parameters such as dimensions, operational speed, and feed material may vary for a particular rotary screen separator, and a cleaning system of the present invention will be designed and operated to optimize cleaning of a particular rotary screen separator.

Figure 14A:
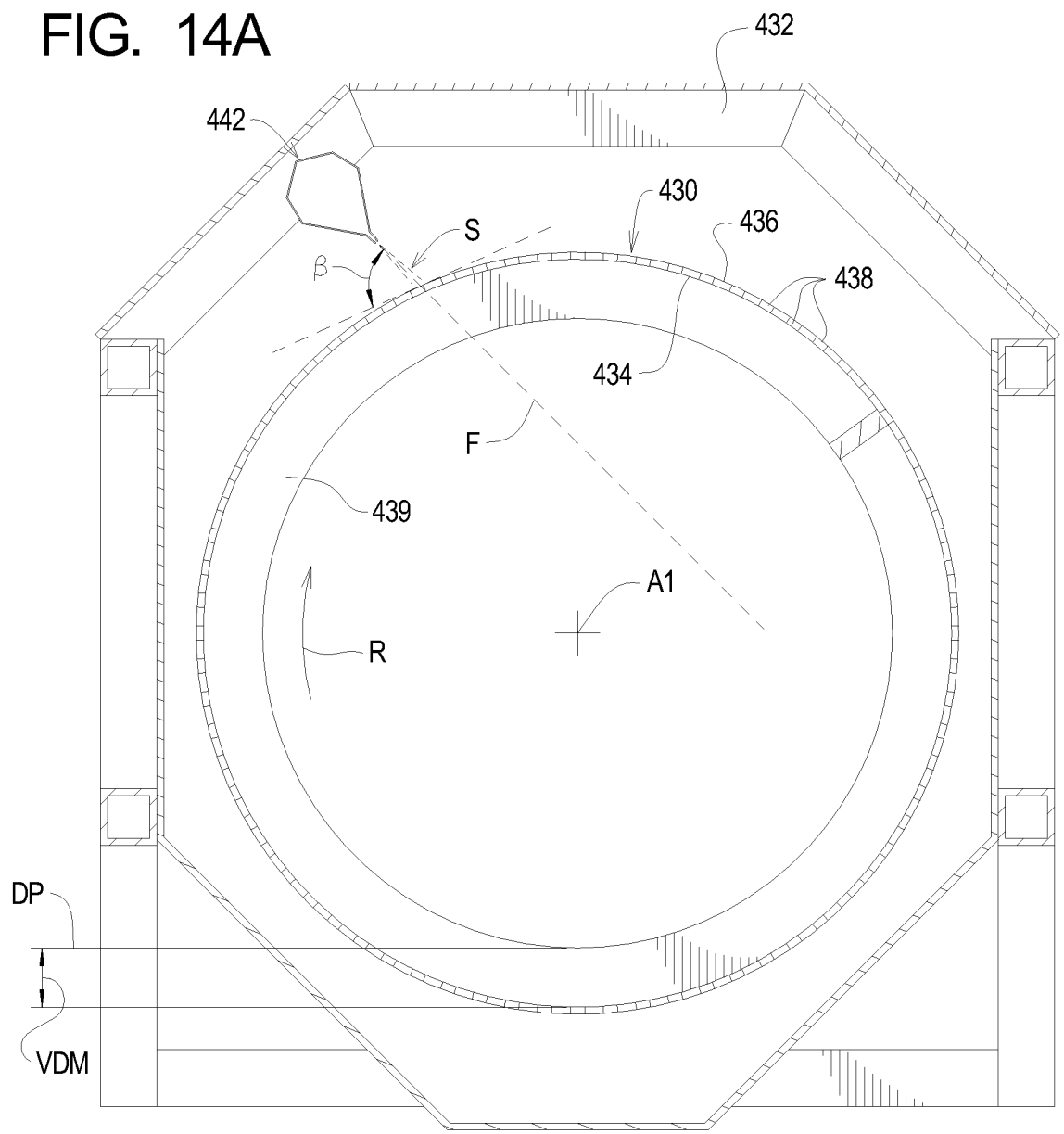
FIGS. 14A and 14B are somewhat schematic end elevation section views illustrating example locations and angles within the rotary screen separator of the first example outlet assembly.

In that context, the following Table A indicates primary parameters associated with a first configuration of the first example cleaning system 422 as shown in FIG. 14A that may be varied for a particular operating environment.

TABLE A

| Parameter | Example | First Preferred Range | Second Preferred Range |
| --- | --- | --- | --- |
| Source Flow Rate (CFM) | 100 | 50-150 | 25-250 |
| Outlet Slot Length SL | 139⅛" | 120-144" | 96-168" |
| Outlet Slot Gap SG | 0.045" | .040-0.075 | 0.025-1.00" |
| Impingement Angle β | 70° | 60-80° | 30-120° |

A cleaning system constructed according to the primary parameters as set forth in the example column of Table A above results in the air movement of approximately 100 cfm per inch at 1.5 psi (or 41.5 in. of water). These standard operating parameters can be adjusted up or down depending on the source of air available at a particular facility.

Figure 14B:
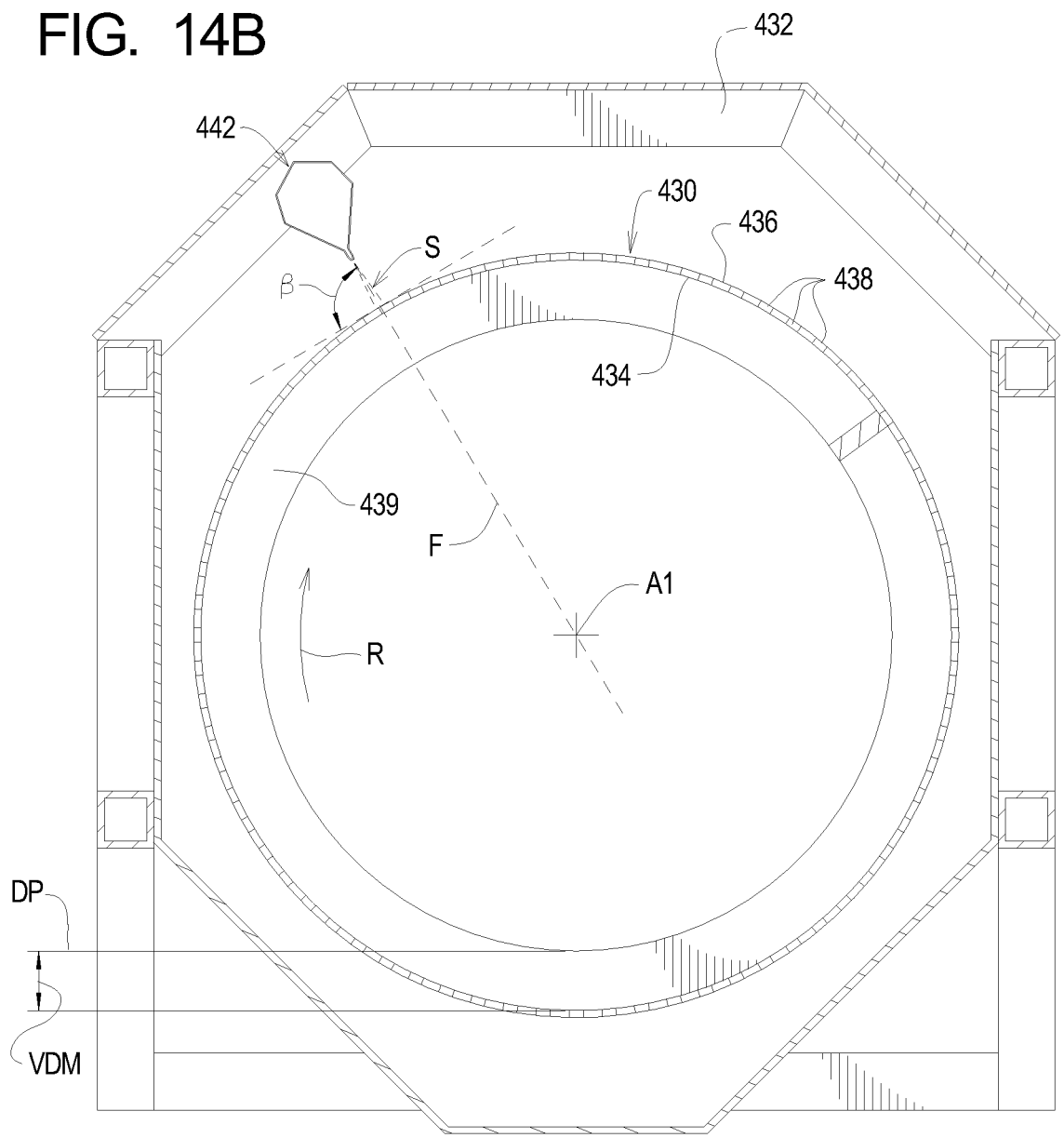

Alternatively, the following Table B indicates primary parameters associated with a second configuration of the first example cleaning system 422 as shown in FIG. 14B that may be varied for a particular operating environment.

TABLE B

| Parameter | Example | First Preferred Range | Second Preferred Range |
| --- | --- | --- | --- |
| Source Flow Rate (CFM) | 100 | 50-150 | 25-250 |
| Outlet Slot Length SL | 139⅛" | 120-144" | 96-168" |
| Outlet Slot Gap SG | 0.045" | 0.040-0.050" | 0.030-0.060" |
| Impingement Angle β | 90° | 80-100° | 67.5-112.5° |

A cleaning system constructed according to the primary parameters as set forth in the example column of Table B above results in the air movement of approximately 100 cfm per inch at 1.5 psi (or 41.5 in. of water). Further, in the example case where the impingement angle is 90°, the flow plane extends through the axis A of the screen 430. These standard operating parameters can be adjusted depending on the source of air available at a particular facility.

More generally, for any cleaning system constructed in accordance with the principles of the present invention, the flow rate per inch of any particular outlet slot will typically be approximately 100 cubic foot per minute per inch of the outlet slot and may be within a first preferred range of approximately 80 to 120 cubic foot per minute per inch. The flow rate per inch of any particular slot should in any event be within a second preferred range of approximately 50 to 150 cubic foot per minute per inch.

In addition to the primary parameters set forth in Tables A and B above, secondary parameters, such as the geometry of the main portion 480, intermediate portion 482, transition portion 486, and outlet portion 488 of the housing chamber 464 are selected to optimize the flow stream S, generally and/or for a particular installation environment of a cleaning system of the present invention.

The air flow stream S exiting the example cleaning system 422 removes debris from the outer surface 436 of the screen 430. In addition, at least a portion of the air forming the air flow stream S passes through the openings 438 to remove debris from the inner surface 434 of the screen 430. Additionally, FIG. 14 illustrates that the area at which the air flow stream S impinges on the outer surface 436 is above, and typically well above, the depth plane DP determined by the depth of the vanes 439. In the example cleaning systems described herein, the air flow stream S impinges on the outer surface at a location on an upper half of the outer surface 436 of the screen 430. That is, the example air flow stream S of the example cleaning systems described herein impinges on the outer surface 436 at a location above a horizontal plane extending through the longitudinal axis A of the screen 430 during normal use of the example rotary screen separator 420.

Figure 19:
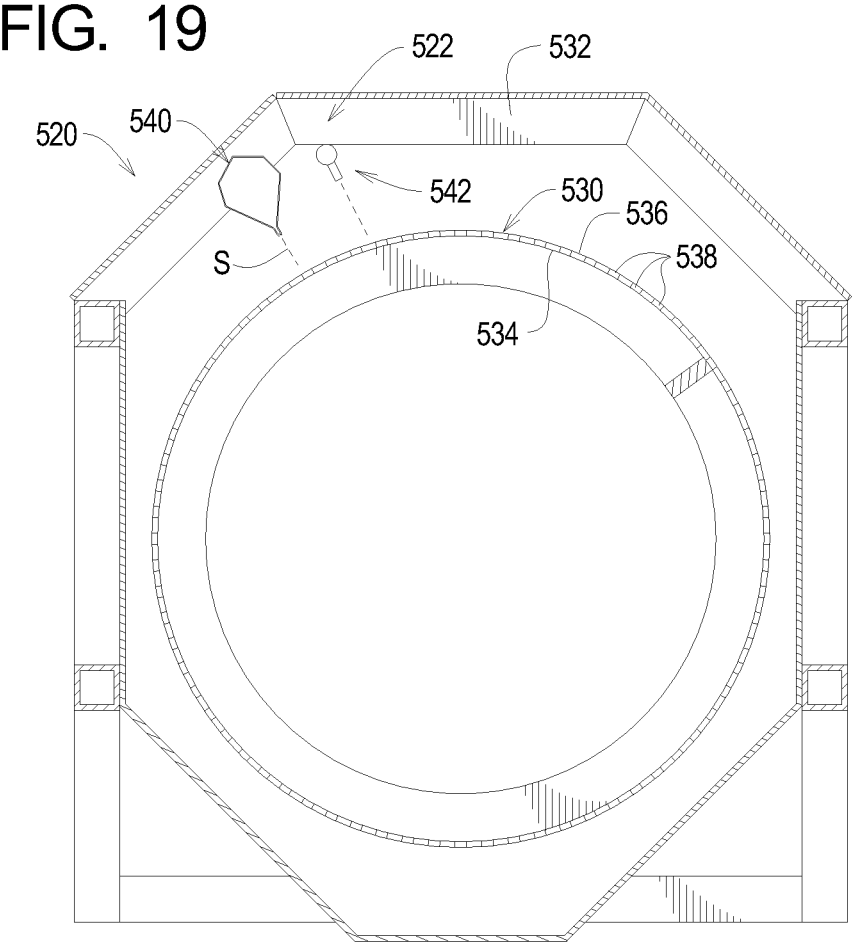
FIG. 19 is somewhat schematic end elevation section view illustrating the use of the first example outlet assembly with a spray system.

Referring now to FIG. 19 of the drawing, depicted therein is a rotary screen separator 520 comprising a second example cleaning system 522. As with the example rotary screen separator 420 described above, the example rotary screen separator 520 may be any screen separator such as the example hybrid rotary screen separators 20, 220, and 320 described above and will not be described herein beyond that extent helpful for a complete understanding of the operation of the second example cleaning system 522. As is conventional, the example rotary screen separator 520 comprises a screen 530 supported for rotation relative to a frame 532. Further, the screen 530 defines an inner surface 534 and an outer surface 536, and holes 538 formed in the screen 530 extend between the inner surface 534 and the outer surface 536.

As can be seen in FIG. 19, the second example cleaning system 522 comprises an air outlet assembly 540 and a liquid outlet assembly 542. The air outlet assembly 540 is or may be the same as the example air outlet assembly 442 described above and thus will not be described herein in further detail. The example liquid outlet assembly 542 may comprise or be formed by sprinklers 118 described above and will also not be described herein in detail.

The second example cleaning system 522 thus may clean the screen 530 in an air mode using air, in a liquid mode using a liquid such as water, or in a combined mode using both air and water simultaneously. Typically, the example cleaning system 522 will operate in the air mode but will switch to the liquid mode or the combined mode when the debris on the screen 530 cannot easily or completely be cleaned using air alone.

Referring now to FIGS. 20 and 21 of the drawing, depicted therein is an outlet assembly 620 that may be used in place of the outlet assembly 442 as part of the first cleaning system 422 or in place of the outlet assembly 540 as part of the second cleaning system 522 as described above.

The geometry of the example outlet assembly 620 is or may be similar to that of the example outlet assembly 442 described above. However, rather than comprising a single inlet fitting like the inlet fitting 462 of the outlet assembly 442, the example outlet assembly 620 comprises a housing structure 630 and first and second inlet fittings 632 and 634. Further the example housing structure 630 defines a first housing chamber 640, a second housing chamber 642, a first outlet slot 644, and a second outlet slot 646. The first and second inlet fittings 632 and 634 define first and second inlet openings 650 and 652, respectively. In use, the inlet fittings 632 and 634 are both separately connected to a conduit system such as the conduit system 454 described above such that air flows from the conduit 454, through the first and second inlet openings 650 and 652, and into the first and second housing chambers 640 and 642. Air flowing into the first housing chamber 640 flows out of the housing structure 630 through the first outlet slot 644, and air flowing into the second housing chamber 642 flows out of the housing structure 630 through the second outlet slot 646.

More specifically, the example housing structure 630 comprises a housing wall 660, proximal and distal end walls 662 and 664, respectively, and an intermediate wall 666 connected to the housing wall 660 between the proximal and distal end walls 662 and 664. The example first inlet fitting 632 is rigidly connected to, and the inlet opening 650 is formed in, the proximal end wall 662. The example second inlet fitting 632 extends through the proximal end wall 662 and the first housing chamber 640 to the intermediate wall 666. The example second inlet fitting 634 is rigidly connected to, and the second inlet opening 652 is formed in, the intermediate wall 666.

The first outlet slot 644 extends along the length of the housing wall 660 from adjacent the proximal end wall 662 to adjacent the intermediate wall 666. The second outlet slot 646 extends along the length of the housing wall 660 from adjacent the intermediate wall 666 to the distal end wall 664. The housing wall 660 may be formed using any of the same techniques discussed above with reference to the housing wall 470.

The use of two separate inlet fittings 632 and 634, two separate housing chambers 640 and 642, and two separate outlet slots 644 and 646 result in two separate flow streams that impinge upon the screen of the rotary screen separator. The use of two separate housing chambers 640 and 642 reduces differences in back pressure within and along the length of the housing structure 630 and thus yields two separate flow streams having a more consistent flow rate of along the length of the housing structure 630. In some situations, the provision of a more consistent flow rate along the length of the housing structure 630 can result in improved cleaning of the screen and thus justify the additional structure required by the example housing structure 630.

A cleaning system such as the example cleaning systems 422 and 522 as described above may be operated continuously. Alternatively, either of the example cleaning systems 422 and 522 may also be operated periodically or asynchronously to save energy.

Figure 22:
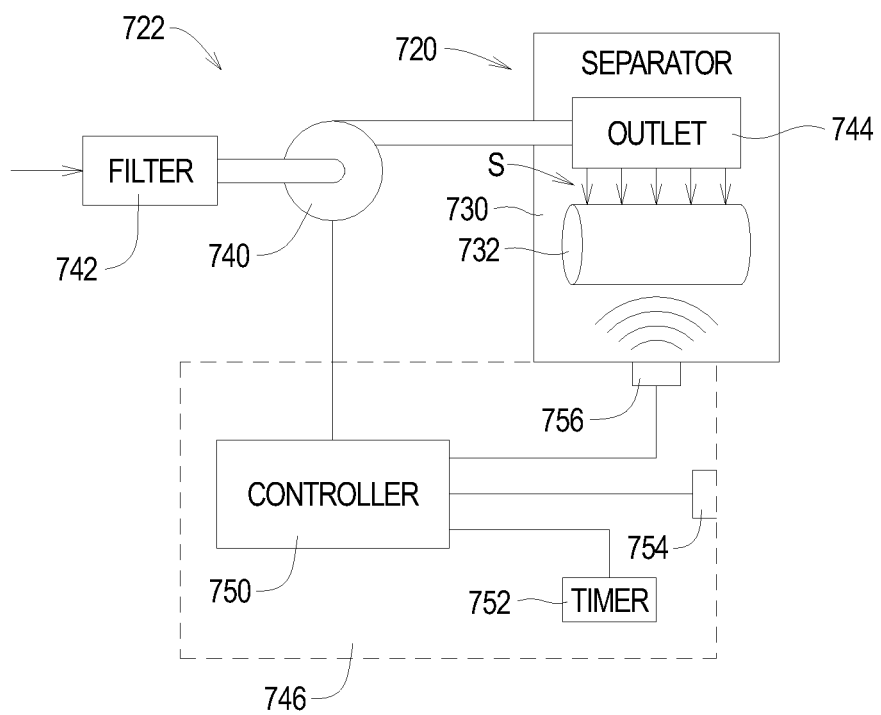
FIG. 22 schematically depicts an example cleaning system employing an control system to control operation of the blower.

For example, FIG. 22 of the drawing depicts a rotary screen separator 720 comprising a third example cleaning system 722. As with the example rotary screen separators 420 and 520 described above, the example rotary screen separator 720 may be any screen separator such as the example hybrid rotary screen separators 20, 220, and 320 described above. The example rotary screen separator 720 comprises a housing 730 and a screen 732 but will not be described herein beyond that extent helpful for a complete understanding of the operation of the second example cleaning system 722.

As shown in FIG. 22, the example cleaning system 722 comprises a blower 740, a filter 742, an outlet 744, and a control system 746. As generally described above, air is drawn by the blower 740 through the filter 742 and out of the outlet 744 in an air flow stream S to remove debris from the screen 732.

The example control system 746 comprises a controller 750 and at least one of a timer 752, a clean button 754, and a debris sensor 756. The clean button 754 is accessible to the operator and generates a CLEAN signal when pressed. The debris sensor 756 is or may be an optical or other sensor capable of generating a DEBRIS signal when debris has built up on the screen 732 of the rotary screen separator 720.

The example controller 750 may control the blower 740 to operate based on a predetermined schedule (e.g., periodically) when the rotary screen separator 720 is operating using the timer 752. An example of a predetermined schedule would be for the controller 750 to turn the blower 740 ON for 20 seconds and then OFF for 3-5 minutes.

In response to the asynchronous generation of the CLEAN signal by the pressing of the clean button 752 and/or of the DEBRIS signal by the one or more debris sensors 756, the controller 746 may be configured to operate the blower 740 for a preset time period (e.g., 20 seconds), for as long as the CLEAN and/or DEBRIS signals are present, or in a pattern predetermined effectively to remove debris from the screen of the separator 720.

In addition, the controller 750 may be configured to perform logic operations that operate the blower 740 based on the information generated by one, two, or all of the timer 752, clean button 754, and debris sensor 756.

In addition, a control system such as the example control system 746 may be used in conjunction with the example cleaning system 442 described above in reference to FIG. 18. In that case, in addition to or instead of operating the blower, the control system may be connected to gate valves such as the gate valves 458 to appropriately clean one or more of the separators 420, 420a, and 420b. And a clean button such as the clean button 754 and/or debris sensor such as the debris sensor 756 may be associated with each of the separators 420, 420a, and 420b. Such an arrangement optimizes the expense of the blower by allowing a single blower to run continuously to service multiple separators or be continual, timed, multiple continual, and multiple with timed on and off, multiple with differing times on, or multiple with differing times and offs. The exact control parameters will depend on factors such as the specifics of the separator or separators, the nature of the material being processed, and possibly energy (electricity) prices.

While the example outlet assembly 442 defines an elongate slot of certain preferred dimensions, multiple smaller slots or openings may be used in addition or instead. Further, a wider slot with more air at lower pressure may also be used.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of the invention.

What is claimed is:

1. A rotary screen separator for processing feed material comprising liquids and solids, the rotary screen separator comprising:
   a screen having a substantially cylindrical shape extending along a longitudinal axis for a screen length, the outer surface of the substantially cylindrical screen being perforated to admit a flow of liquid;
   the rotary screen separator defining an input port and an output port and including:
      a drive system for rotating the screen; and
      at least one vane structure;
   a cleaning system comprising:
      a housing, the housing extending substantially the screen length parallel to and offset from the longitudinal axis and situated outside of the outer surface of the screen and defining at least one housing chamber, at least one inlet opening, and one outlet slot extending parallel to the longitudinal axis and substantially the screen length, the outlet slot being in fluid communication with the housing chamber;
      an air source for supplying air at the inlet opening to flow out of the outlet slot along a flow plane such that the air flow stream impinges on the screen to remove debris from the screen, and
      a conduit system operatively connected between the inlet opening of the housing and the air source;
   wherein operation of the drive system to rotate the separator causes the at least one vane structure to displace the feed material along the longitudinal axis;
      air flows from the air source through conduit system, through the inlet opening, into the housing chamber, and out of the housing chamber through the outlet slot in at least one air flow stream extending along a flow plane; and
      the housing is arranged relative to the screen of the screen separator such that the air flow stream impinges on the screen to remove debris from the screen.

2. A rotary screen separator as recited in claim 1, in which the flow plane extends substantially parallel to the longitudinal axis of the screen.

3. A rotary screen separator as recited in claim 1, in which the flow plane substantially extends through an axis of the screen.

4. A rotary screen separator as recited in claim 1, in which the flow plane intersects the outer surface of the screen at an impingement angle, the impingement angle being defined as to a line tangential to a the outer surface of the screen nearest to the outlet slot at a point of intersection between the flow plane and the outer surface of the screen.

5. A rotary screen separator as recited in claim 4, in which the impingement angle is within a range of 67.5 degrees to 112.5 degrees.

6. A rotary screen separator as recited in claim 4, in which the impingement angle is within a range of 30 degrees to 120 degrees.

7. A rotary screen separator as recited in claim 1, in which the cleaning system comprises a plurality of housings each defining at least one housing chamber, at least one inlet opening, and at least one elongate outlet slot, where each elongate outlet slot is arranged to direct an air flow stream such that the air flow streams impinge on the screen to remove debris from the screen.

8. A rotary screen separator as recited in claim 1, in which:
the cleaning system comprises first and second housings each defining at least one housing chamber, at least one inlet opening, and at least one outlet slot;
the at least one outlet slot of the first housing is arranged to direct an air flow stream such that the air flow streams impinge on the screen at a first angular location about an axis of the screen; and
the at least one outlet slot of the second housing is arranged to direct an air flow stream such that the air flow streams impinge on the screen at a second angular location about the axis of the screen.

9. A rotary screen separator as recited in claim 1, in which:
the cleaning system comprises first and second housings each defining at least one housing chamber, at least one inlet opening, and at least one elongate outlet slot;
the at least one elongate outlet slot of the first housing is arranged to direct an air flow stream such that the air flow streams impinge on the screen at a first location along an axis of the screen; and
the at least one elongate outlet slot of the second housing is arranged to direct an air flow stream such that the air flow streams impinge on the screen at a second location along the axis of the screen.

10. A rotary screen separator as recited in claim 1, in which the housing defines a plurality of housing chambers, a plurality of inlet openings, and a plurality of elongate outlet slots, where each outlet slot is configured to direct an air flow stream such that the flow stream impinges on the screen to remove debris from the screen.

11. A rotary screen separator as recited in claim 1, in which the cleaning system further comprises at least one water jet configured to spray water onto the screen of the rotary screen separator.

12. The rotary screen separator as recited in claim 1, in which each outlet slot defines a slot length dimension of 96-168" and a slot gap dimension of 0.025-1.00".

13. The rotary screen separator of claim 1, further comprising:
a liquid outlet assembly comprising:
at least one sprinkler situated outside of the rotary screen and oriented parallel to each of the longitudinal axis and the outlet slot, the spray issuing from the at least one sprinkler to strike the outer surface to form a spray pattern whose major axis is parallel to a line where the flow plane intersects the outer surface of the screen nearest to the outlet slot.

14. The rotary screen separator of claim 13, wherein the liquid outlet assembly additionally comprises:
a liquid outlet housing in fluid communication with the at least one sprinkler, the liquid outlet housing being situated to extend substantially the screen length parallel to the longitudinal axis and residing outside of the outer surface of the rotary screen.

15. The rotary screen separator of claim 1, further comprising:
a debris sensor to:
survey the outer surface of the screen;
to detect the presence of debris thereon; and
to generate DEBRIS signals indicative of debris when detected;
a controller to:
receive the DEBRIS signals the debris sensor generates;
to evaluate, at least, the DEBRIS signals the debris sensor generates;
selectively to activate the air supply source, in light of the received DEBRIS signals.

* * * * *